(12) United States Patent  
Chung Davidson et al.

(10) Patent No.: US 9,030,496 B1  
(45) Date of Patent: May 12, 2015

(54) METHODS FOR AND APPARATUS FOR INTERACTIVE SCHOOL YEARBOOK

(71) Applicant: Yearbooker LLC, New York, NY (US)

(72) Inventors: Fanny Chung Davidson, New York, NY (US); Robert Davidson, New York, NY (US)

(73) Assignee: Yearbooker LLC, New York, NY (US)

( * ) Notice: Subject to any disclaimer, the term of this patent is extended or adjusted under 35 U.S.C. 154(b) by 0 days.

(21) Appl. No.: 14/535,270

(22) Filed: Nov. 6, 2014

Related U.S. Application Data

(60) Provisional application No. 61/901,042, filed on Nov. 7, 2013, provisional application No. 61/971,493, filed on Mar. 27, 2014, provisional application No. 62/012,386, filed on Jun. 15, 2014.

(51) Int. Cl.
*G09G 5/00* (2006.01)
*G06T 11/60* (2006.01)
*H04L 29/08* (2006.01)

(52) U.S. Cl.
CPC ............... *G06T 11/60* (2013.01); *H04L 67/18* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 6,738,154 B1 * | 5/2004 | Venable | 358/1.15 |
| 2010/0070572 A1 * | 3/2010 | Olson et al. | 709/203 |
| 2014/0080456 A1 * | 3/2014 | Nunn et al. | 455/414.1 |

* cited by examiner

*Primary Examiner* — Phi Hoang
*Assistant Examiner* — Mohammad H Akhavannik
(74) *Attorney, Agent, or Firm* — Joseph P. Kincart; Ideation Law, PLLC

(57) ABSTRACT

The present disclosure provides for image processing apparatus for generating static image data and corresponding Spatial Coordinates as an infrastructure for receiving media input. The media input will generally be related to the image data corresponding with selected Spatial Coordinates. Image data may specifically relate to a physical yearbook converted to static image data.

16 Claims, 18 Drawing Sheets

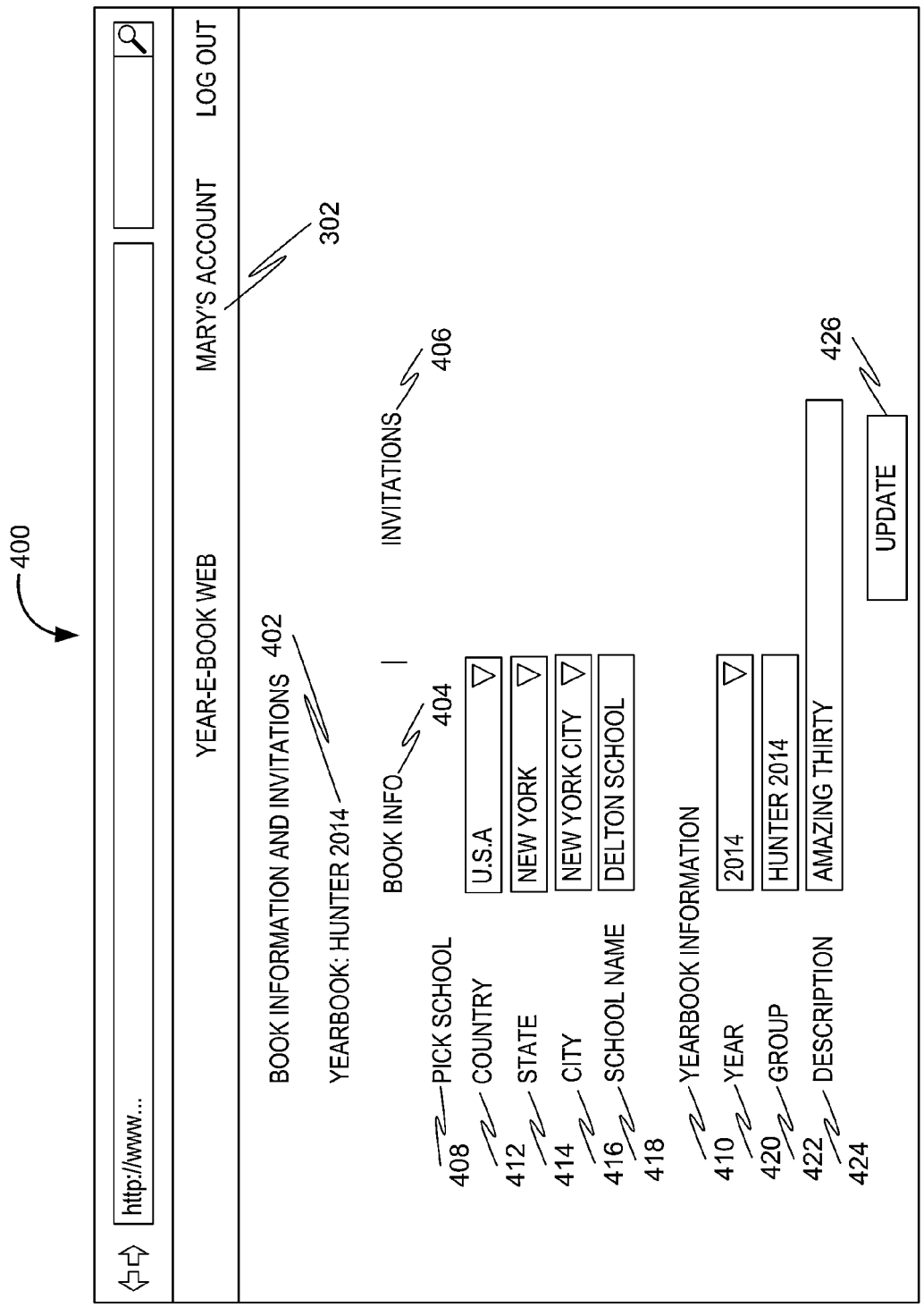

http://www...

YEAR-E-BOOK WEB     MARY'S ACCOUNT     LOG OUT

BOOK INFO AND INVITATIONS — 402
YEARBOOK: HUNTER 2014 — 404
BOOK INFO — |    INVITATIONS — 406

PERSONALIZED INVITATION MESSAGE — 430

GRADE/CLASS — 432

EMAIL — 434    STUDENT FIRST NAME    STUDENT LAST NAME 436
438
440

> ADD MORE ROWS — 442
> UPLOAD EXCEL — 444

446

SEND INVITATIONS — 448

METHODS FOR AND APPARATUS FOR INTERACTIVE SCHOOL YEARBOOK

CROSS REFERENCE TO RELATED APPLICATIONS

The present application claims priority to provisional patent application Ser. No. 61/901,042, filed Nov. 7, 2013, entitled, "METHODS FOR AND APPARATUS FOR INTERACTIVE SCHOOL YEARBOOK"; and provisional patent application Ser. No. 61/971,493, filed Mar. 27, 2014, entitled, "METHODS FOR AND APPARATUS FOR INTERACTIVE SCHOOL YEARBOOK"; and provisional patent application Ser. No. 62/012,386, filed Jun. 15, 2014, entitled, "METHODS FOR AND APPARATUS FOR INTERACTIVE SCHOOL YEARBOOK". The subject matter of each of the foregoing documents is incorporated herein by reference.

FIELD OF THE DISCLOSURE

The present disclosure relates to image processing apparatus for generating static image data and corresponding Spatial Coordinates as an infrastructure for receiving media input from a user and directed to the owner of a volume of the image data.

BACKGROUND OF THE DISCLOSURE

Traditional class and school yearbooks generally carry images of students and teachers in a school and are distributed as mementos towards the end of each school year.

Typically, yearbooks are signed during the last days of school with brief personal provide a Yearbooker Entries by students or faculty to other students. Each signer may select a place to "sign" with their Yearbooker Entries with a pen or marker in a students' yearbook. Students have the ability to allow or not allow fellow students to sign their yearbook book, since the physical book is in their possession and they need not hand it over to all students for signing. Once graduation is complete content is rarely added to yearbooks. The yearbook takes on a time capsule quality.

With the advent of personal computers, mobile phones and tablets, digital social media has provided an alternative to yearbooks. However, social media is generally open to a large group of people with essentially no time limitation. Social media also includes many subjects that go beyond a school experience. What is needed therefore is a digital medium to capture and enhance a school experience.

SUMMARY OF THE DISCLOSURE

Accordingly, the present disclosure provides for image processing apparatus for generating static image data and corresponding Spatial Coordinates as an infrastructure for receiving media input. The static image data may replicate pages of a physical yearbook. Yearbooker Entries including media input will generally correspond to a digital "signing" of a Recipient's yearbook and may include multiple forms of media as opposed to traditional "writing" placed in traditional yearbooks. As such the media input is generally related to the image data corresponding with selected Spatial Coordinates.

In some embodiments, the present disclosure includes a digital version of a yearbook corresponding with a time period during which a student attended school. Unlike social media, the Interactive Yearbooker provides methods and apparatus to memorialize static images and private communications, essentially recreating a physical volume. In addition, the Interactive Yearbooker goes beyond pen and ink as a recording medium and provides for more modern recording mediums, such as, for example, one or more of: a multi view digital image, a selfie with dimensional qualities, a voice over, an audio clip, a video clip, a digital time capsule of information that may only be opened at a later date, and a notification function that communicates to a signer when their message is being viewed.

According to the present disclosure, an image capture device or image generating device creates a static image of a page in a digital format, such as Adobe™ portable document format ("pdf format"). The static layout is mapped according to a Cartesian Coordinate such as, for example an X, Y coordinate or a vector value in combination with a start point and an angle. As a cursor passes over a static image, an opportunity to make an Interactive Yearbooker Entry associated with the particular coordinates is presented to a Yearbooker Signer. As such, a Yearbooker Signature is a private communication from the Yearbooker Signer to the Yearbooker Owner that is associated with a particular place in the Yearbook. The place in the Interactive Yearbooker is designated according to a page and Cartesian Coordinate. In this manner, an Interactive Yearbooker emulates a physical yearbook. It includes private communication from a first person to a second person in the context of a specific pint of a yearbook, and the Yearbooker is associated with a specific academic school year.

Additional embodiments may include other volumes associated with a specific event in time, such as life event for example a wedding album, an anniversary album, reunion, company team building event, confirmation, bar mitzvah, bat mitzvah, baptism, or other event including renditions of static physical volumes and digital interactive communications.

According to one aspect, and in some embodiments, a computerized apparatus for providing an Interactive Yearbooker. The apparatus includes a computer server accessible with a network access device via a digital communications network and executable software stored on the server and executable on demand. The software is operative with the server to cause the apparatus to transmit over the digital communications network a Yearbooker interface comprising a plurality of images, receive via the digital communications network a designation of Signing User selected image comprising the plurality of images, receive via the digital communications network an Cartesian Coordinate Communication associated with the Signing User selected image, receive via the digital communications network a suggested placement position of the Cartesian Coordinate Communication in the Yearbooker interface, determine at least one user associated with the selected image and generate a Yearbooker interface comprising the image and the Cartesian Coordinate Communication associated with the selected image, said Yearbooker interface comprising the image and the Cartesian Coordinate Communication being available upon request to the at least one user associated with the selected image. In some examples, the Cartesian Coordinate Communication may include a private one-to-one provide a Yearbooker Entry accessed or displayed between select individuals alone.

According to another aspect, in some embodiments, a computerized apparatus for providing an Interactive Yearbooker. The apparatus comprising a communications network access device for accessing a server in logical communication with a communications network and executable software stored on the communications network access device and executable on demand. The software operative with the communications network access device to cause the network access device to receive a Yearbooker interface comprising a plurality of images, generate an identifier associated with a user, transmit the identifier to the server request permission to provide an Cartesian Coordinate Communication associated with the image selected from the plurality of images, receive authorization to provide an Cartesian Coordinate Communication associated with the selected from the plurality of images, transmit an Cartesian Coordinate Communication associated with the selected image from the plurality of images, transmit a selected placement of the Cartesian Coordinate Communication in the Yearbooker interface and receive an updated Yearbooker interface comprising a record of the Cartesian Coordinate Communication in the Yearbooker interface based on a response from at least one user associated with the at least one image, wherein the notification includes information about the Cartesian Coordinate Communication.

In another aspect the apparatus may include a computer server accessible with a network access device via a communications network and executable software stored on the server and executable on demand. The software operative with the server to cause the apparatus to receive image data comprising graphical user interface representations of a hardcopy yearbook, receive a request to annotate the image data representative of a hardcopy yearbook, receive an identification of a location in the Yearbooker associated with an image of a person in the yearbook, receive a private one-to-one or more broadly published Cartesian Coordinate Communication to be associated with the image of a person in the Yearbooker and record the Cartesian Coordinate Communication in association with the image of a person in the Yearbooker at the location in the Yearbooker associated with an image of a person.

Accordingly, in some embodiments, methods and apparatus for generating and presenting an interface, which facilitates a students' selection of a place in a digital copy to add their personal Yearbooker Entry to the digital copy. A digital copy owner is typically another student. In some examples, images represented in a digital copy of a Yearbooker may include images of students in a class year, images of students as members of teams, clubs and societies, images of administrators of an associated organization, or employees and staff from an associated organization.

In some embodiments, allows the acceptance or rejection of any students' provide a Yearbooker Entry and places accepted provide a Yearbooker Entries on a digital layer on top of the Yearbooker image. The students may turn-on or turn off a Yearbooker Entry layer to make it visible or invisible respectively.

In some embodiments, provide a Yearbooker Entries can be made as text provide a Yearbooker Entries, in other cases by way of expressive emotion digital "stickers" or images, in yet another as a free-style drawing with a digital finger paint or stylus-based digital paint and draw tools. Including "rich media" such as audio or video.

In another aspect, in some embodiments, for apparatus and methods to allow a person to provide a Yearbooker Entry on a non-student embodiment, which could be a team, a club, an interest group or a company Yearbooker with the intent of including most or all active members of a team, a club, an interest group or a company.

In some embodiments, also allows for multiple dimensional views, that is, a person, object, subject or group may appear at different locations in alternate views at different times. For example a user may collect most or all the images of another user throughout many yearly editions of yearbooks and create a collection. In another aspect, in some embodiments, for an administrative or "admin" panel or interface. The admin interface may allow a properly authorized individual to control or configure aspects of the Yearbooker interface.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an image generating apparatus for providing a yearbooker volume, the apparatus including: an image capture device for generating digital image data representative of one or more pages of a hardcopy yearbook; one or more computer servers for post processing the digital image data representative of one or more pages of the hardcopy yearbook, said computer server in logical communication with the image capture device and accessible with a network access device via a digital communications network; and executable software stored on the one or more computer servers and executable on demand, the software operative with the one or more servers to cause the apparatus to perform actions.

The apparatus may receive static image data from the image capture device, said static image data correlating with pages of a physical yearbook; correlate spatial coordinates with specified areas of the static image data from the image capture device; transmit over the digital communications network a first yearbooker interface including the static image data and the spatial coordinates correlated with specified areas of the static image data; receive via the digital communications network an identification of a signing user; receive via the digital communications network a designation of the spatial coordinate associated with the specified area of the static image data; receive via the digital communications network a yearbooker entry associated with the signing user and the spatial coordinate, where said yearbooker entry includes a media entry and a designation of a recipient user; generate a second yearbooker interface including the static image data and the yearbooker entry located in the specified area correlated with the spatial coordinates; and transmit a yearbooker volume including the second yearbooker interface via the digital communications network to the recipient user where the yearbooker volume includes yearbooker entries specifically entered for the recipient user. Other embodiments of this aspect include corresponding computer systems, apparatus, and computer programs recorded on one or more computer storage devices, each configured to perform the actions of the methods.

Implementations may include one or more of the following features. The apparatus where the executable software stored on the one or more computer servers and executable on demand is additionally operative with the one or more computer servers to cause the apparatus to transmit a notification to the recipient user that the yearbooker entry has been received. The apparatus where the executable software stored on the one or more computer servers and executable on demand is additionally operative with the one or more computer servers to cause the apparatus to receive a response from the recipient user to accept the yearbooker entry into a storage as part of the recipient user's yearbooker. The apparatus where the static image data includes images of students associated with a same learning institution. The apparatus where the static image data includes images of employees of a same legal entity. The apparatus where the static image data includes images of team members of a same sports team. The apparatus where the static image data includes images of members of a same school activity group.

Implementations may include one or more of the following features. The apparatus where the yearbooker entry includes a text message. The apparatus where the yearbooker entry includes a digital image. The apparatus where the yearbooker entry includes an emoticon. The apparatus where the yearbooker entry includes a free-style drawing. The apparatus where the yearbooker entry includes an audio clip. The apparatus where the executable software stored on the one or more computer servers and executable on demand, is additionally operative with the one or more computer servers to cause the apparatus to receive a subsequent yearbooker entry from the signing user, where the subsequent yearbooker entry is correlated with the spatial coordinates. The apparatus where the software is additionally operative to transmit an administrator interface to configure the yearbooker interface. The apparatus where the network access device includes a mobile device communicating via a 4G cellular network. The computerized apparatus where the communications network access device includes a mobile device communicating via a 4g cellular network. Implementations of the described techniques may include hardware, a method or process, or computer software on a computer-accessible medium.

One general aspect includes an apparatus for receiving a yearbooker volume. The apparatus also includes a communications network access device for accessing a server in logical communication with a digital communications network; and executable software stored on the communications network access device and executable on demand, the software operative with the digital communications network access device to cause the network access device to perform actions.

The apparatus may also receive a yearbooker interface including static image data generated via an image capture device, said static image data correlating with pages of a physical yearbook and a yearbooker entry correlating with spatial coordinates designating specified areas of the static image data from the image capture device. The apparatus may also transmit over the digital communications network an instruction to accept the yearbooker entry. The apparatus may also transmit the yearbooker volume including the yearbooker interface via the digital communications network to a recipient user where the yearbooker volume includes yearbooker entries specifically entered for the recipient user. Other embodiments of this aspect include corresponding computer systems, apparatus, and computer programs recorded on one or more computer storage devices, each configured to perform the actions of the methods.

Implementations may include one or more of the following features. The apparatus where the network access device includes a mobile device communicating via a 4G cellular network. The computerized apparatus where the communications network access device includes a mobile device communicating via a 4g cellular network. Implementations of the described techniques may include hardware, a method or process, or computer software on a computer-accessible medium.

One general aspect includes a computerized apparatus for providing a yearbooker entry. The apparatus may include a communications network access device for accessing a server in logical communication with a digital communications network; and executable software stored on the communications network access device and executable on demand, the software operative with the communications network access device to cause the network access device to: receive a yearbooker interface including static image data generated via an image capture device, said static image data correlating with pages of a physical yearbook and spatial coordinates designating specified areas of the static image data from the image capture device; generate a modified yearbooker interface including the static image data generated via an image capture device and a yearbooker entry correlated to specific entry spatial coordinates; transmit over the digital communications network an identifier of a yearbooker signer; and transmit over the digital communications network a modified yearbooker interface and an identifier of a recipient user to receive the modified yearbooker entry. Other embodiments of this aspect include corresponding computer systems, apparatus, and computer programs recorded on one or more computer storage devices, each configured to perform the actions of the methods.

Implementations may include one or more of the following features. The computerized apparatus where the communications network access device includes a mobile device communicating via a 4g cellular network. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIGS. 4A-B an illustration of a web interface viewed by the main contact, the web interface includes functionalities that may be used to implement some embodiments of the present disclosure.

DETAILED DESCRIPTION

Figure 1A:
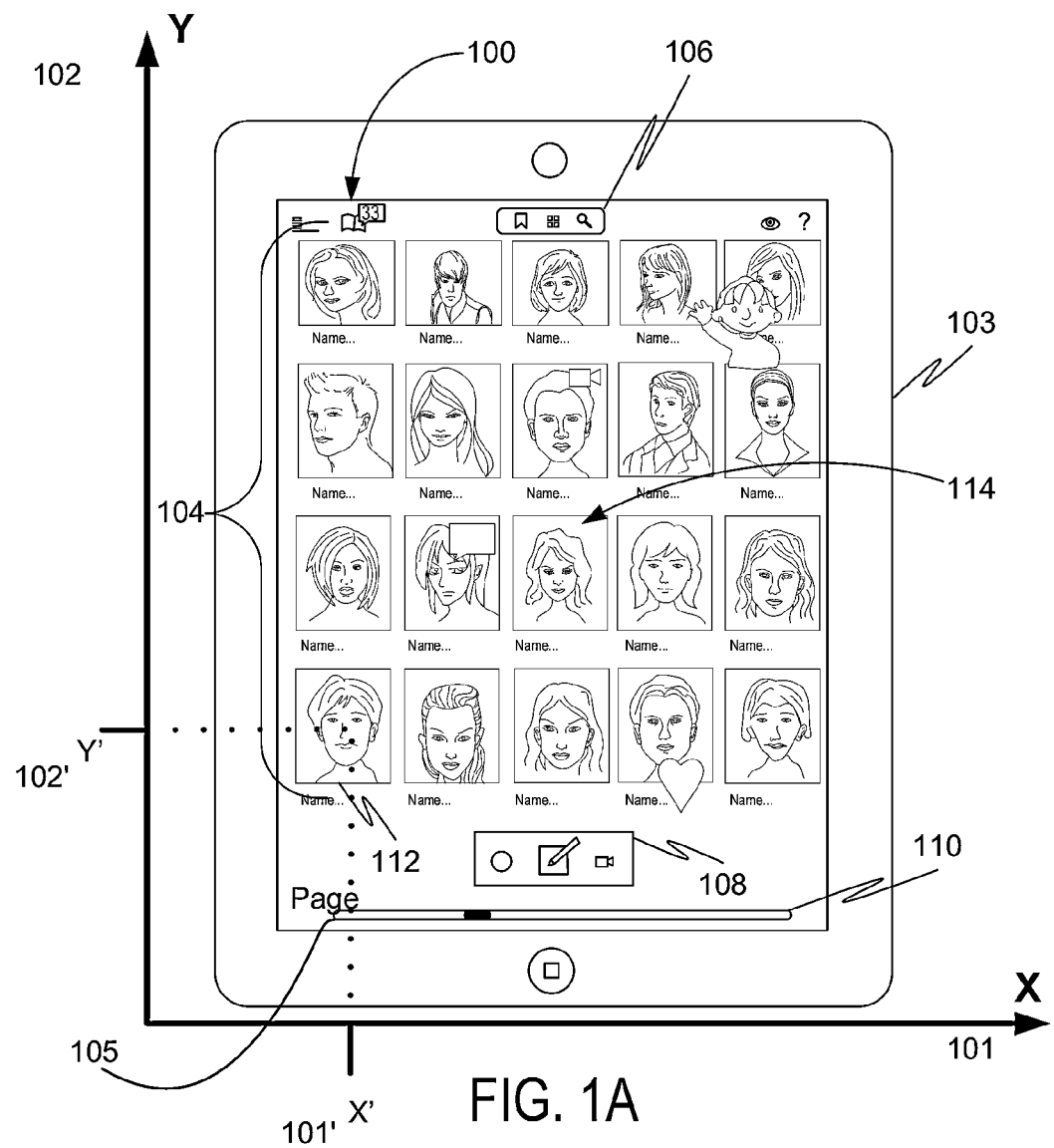
FIGS. 1A-1D illustrate block diagrams of exemplary user interfaces including functionalities that may be used to implement some embodiments of the present disclosure.

The present disclosure provides for apparatus and methods to generate images of a static Yearbooker or other event volume and associate Yearbooker Entries with a spatial designation coordinate of one or more images.

In general, an image capture device or image generating device creates a static image of a page in a digital format, such as Adobe™ portable document format ("pdf format"). The static image is associated with a system of spatial coordinates, such as Cartesian Coordinates or Polar Coordinates. For example X, Y coordinates or a vector value in combination with a start point and an angle. As a cursor passes over a static image, an opportunity to make an Interactive Yearbooker Entry associated with particular coordinates associated with a positon of a cursor is presented to a Yearbooker Signer. An entered Yearbooker Signature is a private communication between a Yearbooker Signers a Yearbooker Owner that is associated with a particular place in the Yearbook. The place in the Interactive Yearbooker is designated according to a page and Spatial Coordinate. In this manner, an Interactive Yearbooker emulates a physical yearbook. It includes private communication from a first person to a second person in the context of a specific point of a yearbook, and the Yearbooker is associated with a specific academic school year.

In some embodiments, a Yearbooker index may associate a page and Spatial Coordinate with a subject. A subject matter may be a person's name, such as a students or faculty member's name; a group, such as an academic or sports related group or team; a location or other subject.

In some embodiments, an apparatus includes a computer server accessible with a network access device via a digital communications network and executable software stored on the server and executable on demand. The software operative with the server to cause the apparatus to transmit over the digital communications network a Yearbooker interface comprising a plurality of images, receive via the digital communications network a designation of Signing User selected image comprising the plurality of images, receive via the digital communications network an Cartesian Coordinate Communication associated with the Signing User selected image, receive via the digital communications network a suggested placement position of the Cartesian Coordinate Communication in the Yearbooker interface, determine at least one user associated with the selected image and generate a Yearbooker interface comprising the image and the Cartesian Coordinate Communication associated with the selected image, said Yearbooker interface comprising the image and the Cartesian Coordinate Communication being available upon request to the at least one user associated with the selected image.

In some embodiments, Yearbooker automated apparatus includes a processor and executable software, executable upon demand to allow a user to provide a Yearbooker Entry on a student or other subject matter associated with a Spatial Coordinate.

In some embodiments, apparatus receives Yearbooker Entry communications data and displays the resulting messages at places indicated in the receivers' digital yearbook, provided the permission is granted by the receiver.

Executable software may be operative in conjunction with a processor to execute methodologies that display the resulting provide a Yearbooker Entries or communication of personal expression.

In some embodiments, an apparatus is disclosed capable of embodying the innovative concepts described herein. Image presentation can be accomplished via any multimedia type interface. Embodiments can therefore include a PC, handheld, game controller; PDA, cellular or other mobile or handheld device, HDTV or other multimedia device with user interactive controls, including, in some embodiments, voice activated interactive controls.

GLOSSARY

As used herein the following terms will have the following associated meaning:

"Yearbooker", "Digital Yearbook" or "Virtual Yearbook" as used herein means a web service providing user interfaces displaying static images associated with one or more of: students, faculty and activities of a school or university and details of school activities during a designated academic year. The user interfaces include user interactive areas that allow users to interact with the yearbook; for example, provide a Yearbooker Entry on particular images.

"User" as used herein includes a person who operates a Network Access Device to access a Yearbooker. Examples of Users may include one or more of: students, parents, teachers, school coordinators and third party service providers such as printers, imagers, web service administrators.

"Main Contact" as used herein includes a school representative, a Parent-Teacher Association (PTA) representative, a student committee representative and a year coordinator. In some embodiments a main contact gets administrator rights to the Yearbooker Web Server.

"Yearbooker Entry" or "Provide a Yearbooker Entry" as used herein is a recorded Communication that corresponds with a Spatial Coordinate and page of a static media volume associated with a media owner. Examples of Yearbooker Entries include one or more of: a text, a video, an audio, an animation, an emoticon, a sticker, and a free-style drawing such as an autograph made with a digital finger paint or stylus-based digital paint and draw tools. In preferred embodiments, a Yearbooker Entry is a one-user to one volume private message.

"Mobile device" as used herein is a wireless mobile communications network access device for accessing a server in logical communication with a communications network. The mobile device may include one or more of a cellular, mobile or CDMA/GSM device, a wireless tablet phones, personal digital assistants (PDAs), "Mobile network" as used herein includes 2G, 3G, 4G internet systems and wireless fidelity (Wi-Fi), Wireless Local Area Network (WLAN), Worldwide Interoperability for Microwave Access (Wi-MAX), Global Mobile System (GSM) cellular network, spread spectrum and CDMA systems, Time division multiple access (TDMA), and Orthogonal frequency-division multiplexing (OFDM). The mobile device is capable of communicating over one or more mobile network.

"Network Access Device: shall mean an electronic device with a human interactive interface capable of communicating with a Network Server via a digital communications network.

"One-to-One" shall mean a Yearbooker Entry that is recorded by one user directly on to a media volume, such as a Yearbooker, of a second user and is not accessible by third party users.

Spatial Coordinate: as used herein shall mean a designation of a particular location on a page. Specific examples of Spatial Coordinate include Cartesian Coordinates and Polar Coordinates.

"User interface" or "Web interface" is a set of graphical controls through which a user communicates with a Yearbooker. The user interface includes graphical controls such as button, toolbars, windows, icons, and pop-up menus, which the user can select using a mouse or keyboard to initiate required functions on the Yearbooker interface.

"Wireless" includes a communication protocol and hardware capable of digital communication without hardwire connections. Examples of Wireless include: Wireless Application Protocol ("WAP") mobile or fixed devices, Bluetooth, 802.11b, or other types of wireless mobile devices. 8 below.

"Yearbooker" as used herein means a collection of digital images, each respective image emulating a page from a physical yearbook and associated with multiple areas identifiable via Spatial Coordinates. Yearbooker Entries may be associated with the areas identifiable via Spatial Coordinates.

Referring now to FIG. 1A, a block diagram illustrates an exemplary user Network Access Device 103 with a Yearbooker User Interface 100 displayed thereon. The user interface 100 includes functionalities that may be used to implement some embodiments of a Yearbooker. Typically, a Yearbooker user interface displays image data 104, such as images of students, in a Yearbooker as seen by most or all users including students, parents, teachers and administrators. The students may be associated with a same learning institution, same sports team or same school activity group. Alternatively, the image data 104 may be related to faculty of a school or university, employees of a same company, members of a group, members of a family or other definable group of people.

The user interface 100 includes image data 104 associated with Spatial Coordinate positions 101-102. A user may designate a Spatial Coordinate 101' 102' and operate a User interactive control to provide a media entry associated with the Spatial Coordinate 101' 102'. Typically, the User media entry will be associated with an image correlating with the Spatial Designation, such as for example an image of a photograph of a student. A user interactive area 106 may receive input from a user and provide one or both of human readable content or human recognizable images.

In some preferred embodiments, a system of Spatial Coordinates 101-102 will not be ascertainable to a user. The user will make a selection of a Spatial Coordinate via a cursor control or touch screen input. For example, a user 112 may input a cursor click on area of a static image that includes a likeness of a student. The area associated with the first user 112 that receives the cursor click will be associated with one or more Spatial Designations 101' 102'. As illustrated, the Spatial Designations may be determined via a Cartesian Coordinate. Other embodiments may include a Polar Coordinate.

In various embodiments of the present disclosure, interactive areas may include, by way of a non-limiting example, one or more of: a) a user interactive area 106 that allows a user to search an index for Spatial Coordinates that correspond with subject matter, such as images or text descriptive of a particular person or subject; b) a user interactive area 108 that allows a user to provide a Yearbooker Entry according to Spatial Coordinates and page selected; c) a user interactive area 110 that allows a user to scroll 105 to view content, such as images of students in the yearbook. The user interface 100 may be provided by a software application installed on a network access device 103, such as a mobile device. Alternatively, the user interface 100 may correspond to a webpage obtained from a website. The software application or the website may interact with a Yearbooker web service hosted on a computerized network server to provide the user interface 100 on the network access device 103.

A user, such as a first student, viewing the user interface 100 on a Network Access Device 103 may select an area associated with the first user 112 of a User Interface 100 that is associated with a subject a Yearbooker Entry. In some embodiments, the Yearbooker Entry may be for the benefit of a second user, such as a second student. The area selected by the first student 112 may, for example, include an image of themselves, or another subject.

An area may be selected according to Spatial Coordinates. The Spatial Coordinates designate a particular location on a User Interface. According to the present disclosure, portions of a static image of a Yearbooker page, such as a pdf image may be associated with a particular subject. For example, Spatial Coordinates X' and Y' may be associated with an image the first student on a particular page Alternatively, a user may tap on Spatial Coordinates that correspond with a chosen subject, such as an image of a student, which may represent a second user 114, or use the user interactive area 106, which may comprise a search tool, and an associated index that matches Spatial Coordinates and page numbers with subject matter. After a particular Spatial Coordinate has been indicated, a user may make a Yearbooker Entry into a Yearbooker associated with a particular user. In some embodiments, a first user may enter a Yearbooker Entry into multiple Yearbooker volumes associated with multiple Yearbooker owners in a single entry action by designating multiple destination Yearbookers.

Figure 1B:
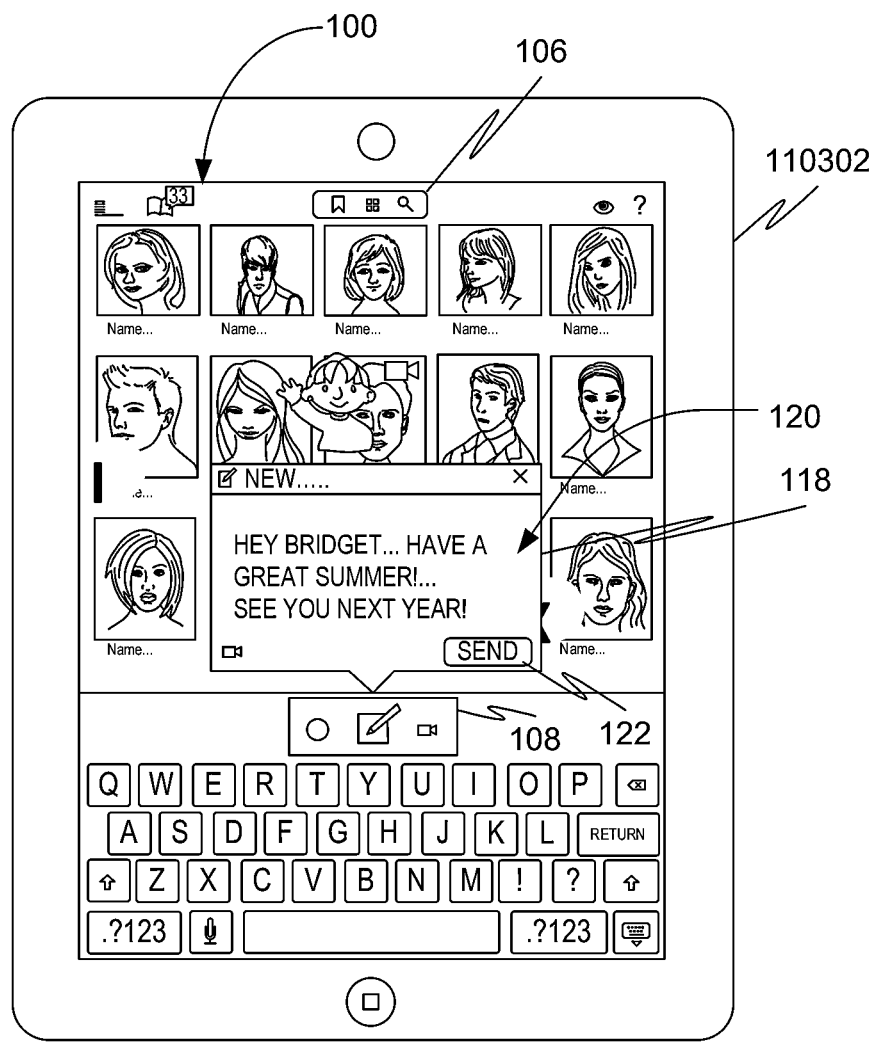

In some embodiments, the user interface 100 displays a text box 118 as shown in FIG. 1B. A first user may select a type of Yearbooker Entry . . . Yearbooker entries may include, for example, one or more of: a text message, an emoticon, free-style drawing, a video and an audio message. A user may select a type of Yearbooker Entry an initiate its entry via an appropriate option from the user interactive area 108. Alternatively, when a user taps Spatial Coordinates associated with an image of a second user 114, or uses a user interactive area 106, which may comprise a search tool, the user interface 100 may show a drop down menu from which the first user 112 may select the type of a Yearbooker Entry.

Further, in some embodiments, a speech-to-text converter may be used to convert an audio Yearbooker Entry into text. Yet further, in some embodiments, the first user 112 may designate Spatial Coordinates associated with an image of the second user 114 and link a captured image (selfie) or initiate a video recording of the first user 112 speaking to the second user 114. The captured image or the recorded video is then uploaded on the Yearbooker Web Server. The first user 112 may also select a location for a Yearbooker Entry on the user interface 100. Further, in some embodiments, the first user 112 may send the same message to the multiple students by selecting multiple students the user interface 100. Yet further, in some embodiments, the first user 112 may select an extracurricular club, an interest group or a sports team to send same message to most or all students in the respective club, group or sports team.

In some exemplary embodiments, the first user 112 selects an option from the user interactive area 108 to provide a text provide a Yearbooker Entry. Accordingly, the user interface 100 displays, referring to FIG. 1B the text box 118. Then, the first user 112 types a text 120 in the text box 118. The text 120 may read, for example: "Hey Bridget . . . Have a great summer! . . . See you next year!" Finally, the first user 112 clicks on a "send" button 122 to submit the text 120. Further, when the text 120 is submitted, the mobile device of the first user 112 may determine the location of the first user 112 and send the location information along with the text 120 to the Yearbooker Web Server. Further, in some embodiments, the location of the first user 112 may be displayed along with a Yearbooker Entry on the user interface 100. In addition, a date and time stamp may be displayed along with a Yearbooker Entry.

In some embodiments, each Yearbooker Entry received by the Yearbooker Web Server is associated with a universally unique identifier (UUID). The UUID may be referenced to track and manage Yearbooker Entries.

Figure 1C:
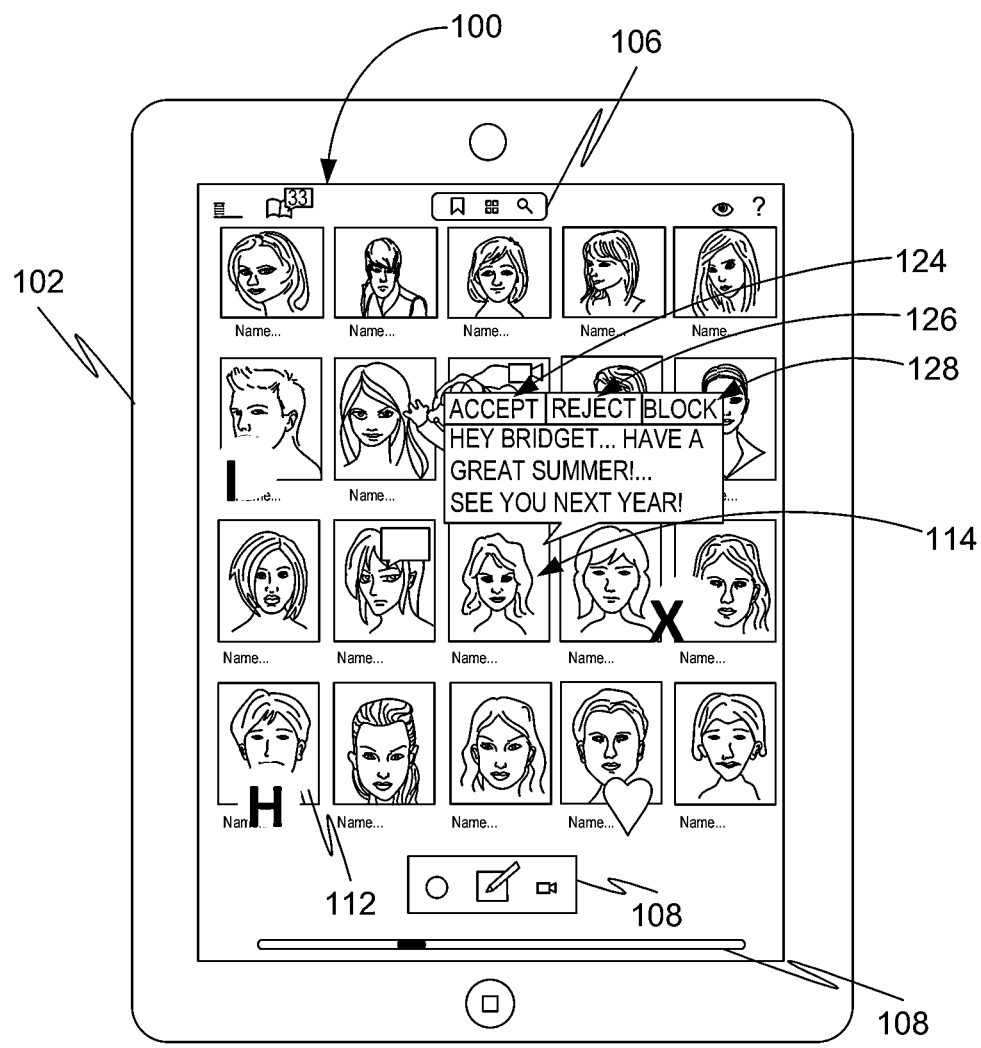

Referring now to FIG. 1C a user interface 100 is illustrated that may be displayed on a mobile network access device of the second user 114. The Yearbooker Web Server may transmit a notification to the second user 114, wherein the notification includes information about a Yearbooker Entry received from the first user 112. As shown, in some embodiments, the user interface 100 conveys the displays the Yearbooker Entry, such as a text message 120 submitted by the first user 112 for the second user 114. The user interface 100 allows the second user 114 to accept or reject the Yearbooker Entry with text 120 by using an interactive control, such as one of an "accept" button 124 and a "reject" button 126.

If the second user 114 rejects the Yearbooker Entry with text 120, it does not become associated with the Yearbooker, or other media volume associated with the second user 114. Some embodiments may also include a "block" function 128, which may be used to completely block the first user 112 from sending more Yearbooker Entries. For example a second user 114 may use the "block" button 128 if the text 120 is inappropriate; when the second user 114 does not know the first user 112; or if the second user 114 simply does not wish to receive Yearbooker Entries from the first user 112. A student may also be able to "white list" messages and or provide a Yearbooker Entries by activating functionality to: "Accept messages from a source", such as, for example, a user identified as Student 123.

Figure 1D:
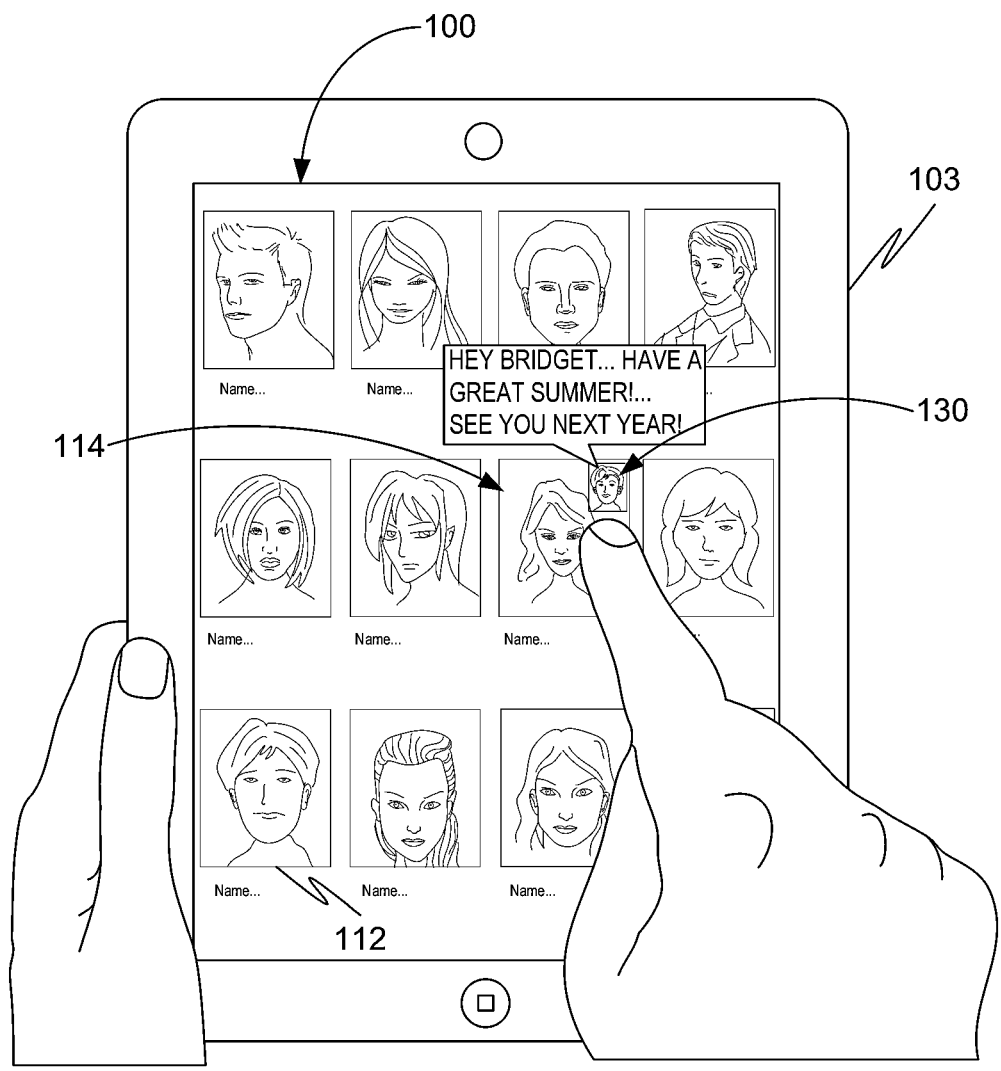

Referring now to FIG. 1D an illustration of the user interface 100 viewed by the second user 114. The user interface 100 showing the accepted Yearbooker Entry in places as seen by the second user 114. Next to the second user's 114 large image, there is a small icon 130 with the image of the first user 112. The user interface 100 places the accepted provide a Yearbooker Entries on a digital provide a Yearbooker Entry layer on top of the students' images, allowing the second user 114 to turn-on and turn-off a Yearbooker Entry layer to make it visible and invisible respectively.

In some aspects, multiple users may send private one-to-one messages to other students, and respective users may accept or reject Yearbooker Entries individually; therefore, each user may view and own a different digital copy of their Yearbooker. For example, the first user 112 may provide a Yearbooker Entry on multiple students. Some of the students may accept a Yearbooker Entry and some may reject. Accordingly, each user may view a different version of the same yearbook.

Web Interface

Figure 2:
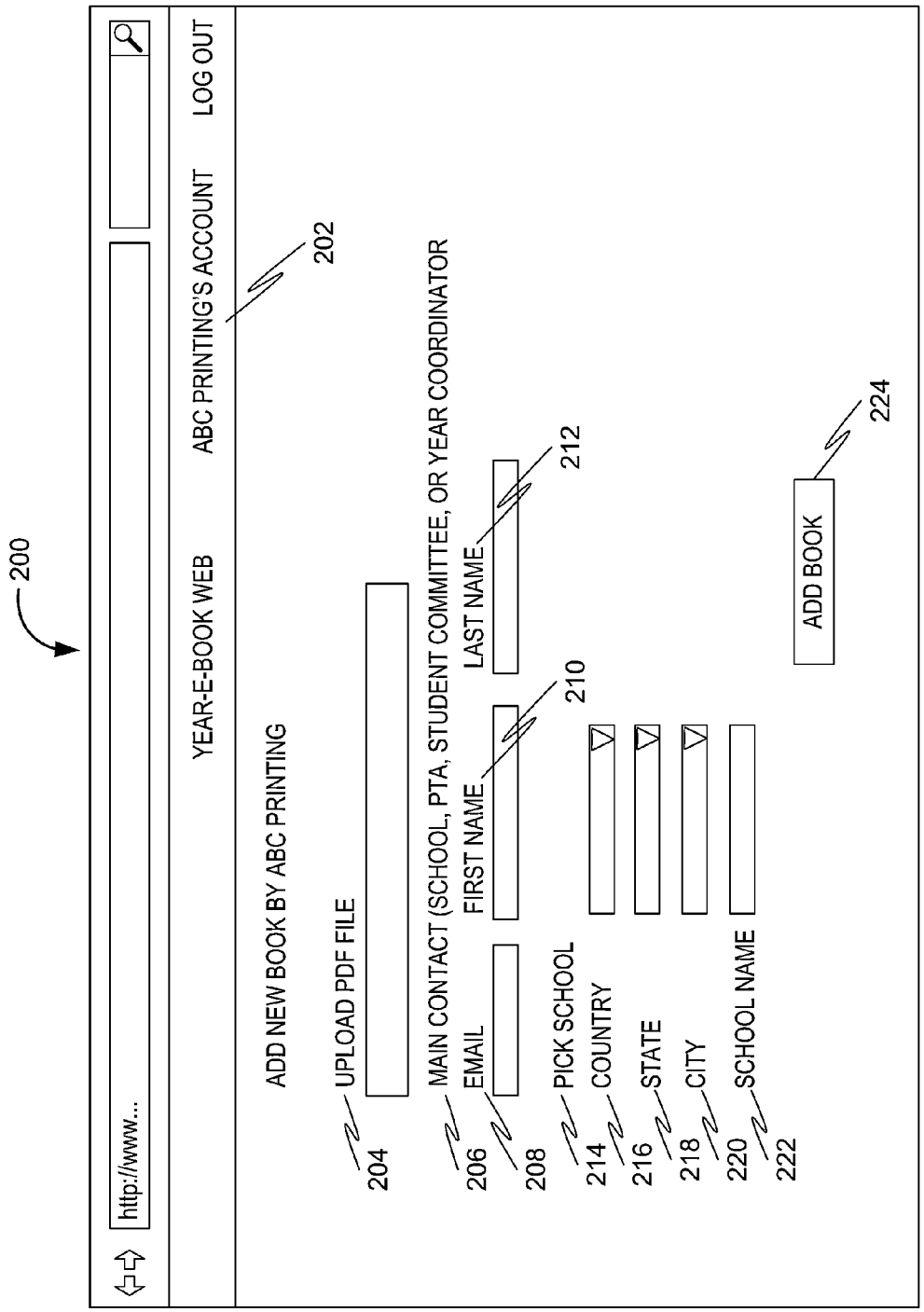
FIG. 2 illustrates a web interface viewed by an administrator, the web interface including functionalities that may be used to implement some embodiments of the present disclosure.

Referring now to FIG. 2 an illustration of a web interface 200 according to some aspects of some embodiments of the present disclosure. The web interface 200 includes functionalities that may be used to implement some embodiments of the present disclosure. The web interface 200 may include a representation of a static image correlating with a Yearbooker page and Spatial Coordinates corresponding with areas of each static image. The third party service provider may be a printing company (such as ABC printing 202) that specializes in preparing yearbooks or an Internet company providing the Yearbooker Web Server to learning institutions to upload and view their yearbooks.

In some embodiments, the web interface 200 includes a web form that allows an administrator to add a new Yearbooker to the Yearbooker Web Server. The administrator may upload a new Yearbooker book using an "Upload PDF file" form field 204. Further, the new book may be uploaded in one of PDF, DOC, DOCX, PPT and PPTX formats. Next, the administrator may add a main contact for the Yearbooker using a "Main Contact" form field 206. The "Main Contact" form field 206 allows the administrator to provide an email address 208, a first name 210 and a last name 212 of the main contact. A "Pick School" form field 214 allows the administrator to include school information such as a country 216, a state 218, a city 220 and a school name 222. Further, the "Pick School" form field 214 may allow the administrator to fill in a year, a group and a title of the Yearbooker (not shown). In addition, the administrator may use an "Add book" button 224 to submit the static yearbook images to the Yearbooker Web Server. Once the static yearbook entries are uploaded with most or all the required information, the Yearbooker Web Server generates a unique master book ID per upload. The book ID may be generated in the format: "school name_year_group/title name". The Yearbooker Web Server provides a confirmation when the book is uploaded successfully.

The Yearbooker Web Server may provide access to yearbooks to users including, for example: students, faculty and parents in exchange for a payment. Further, advertisements may be added to the web interfaces (including the web interface 200) provided by the Yearbooker Web Server. Some examples of the advertisements include banner advertisements, pop-up advertisements, and the like. The administrator may provide hyperlinks to specific advertisements, such as, by way of non-limiting example, for framed or poster board versions of Yearbooker images and Yearbooker Entries, for products that may interest the users, for a fundraiser for the school or other purpose. Alternatively, the administrator may provide advertisements using a third-party Internet advertising network including for instance Google Adwords®, Facebook Ads®, or Bing® Ads. The third-party internet advertising networks may provide contextual advertisements.

Further, web interfaces may allow an administrator to manage accounts, create user accounts, reset passwords, delete books and add books on the Yearbooker Web Server. Moreover, the web interfaces may provide one or more features to the administrators including defining administrator rights, selecting administrator users, re-uploading book PDF, updating book information, inviting users, un-inviting users, sending incremental invites, displaying user statistics, inserting new pages to the Yearbooker Web Server, tracking revenue details and managing advertisements.

Figure 3:
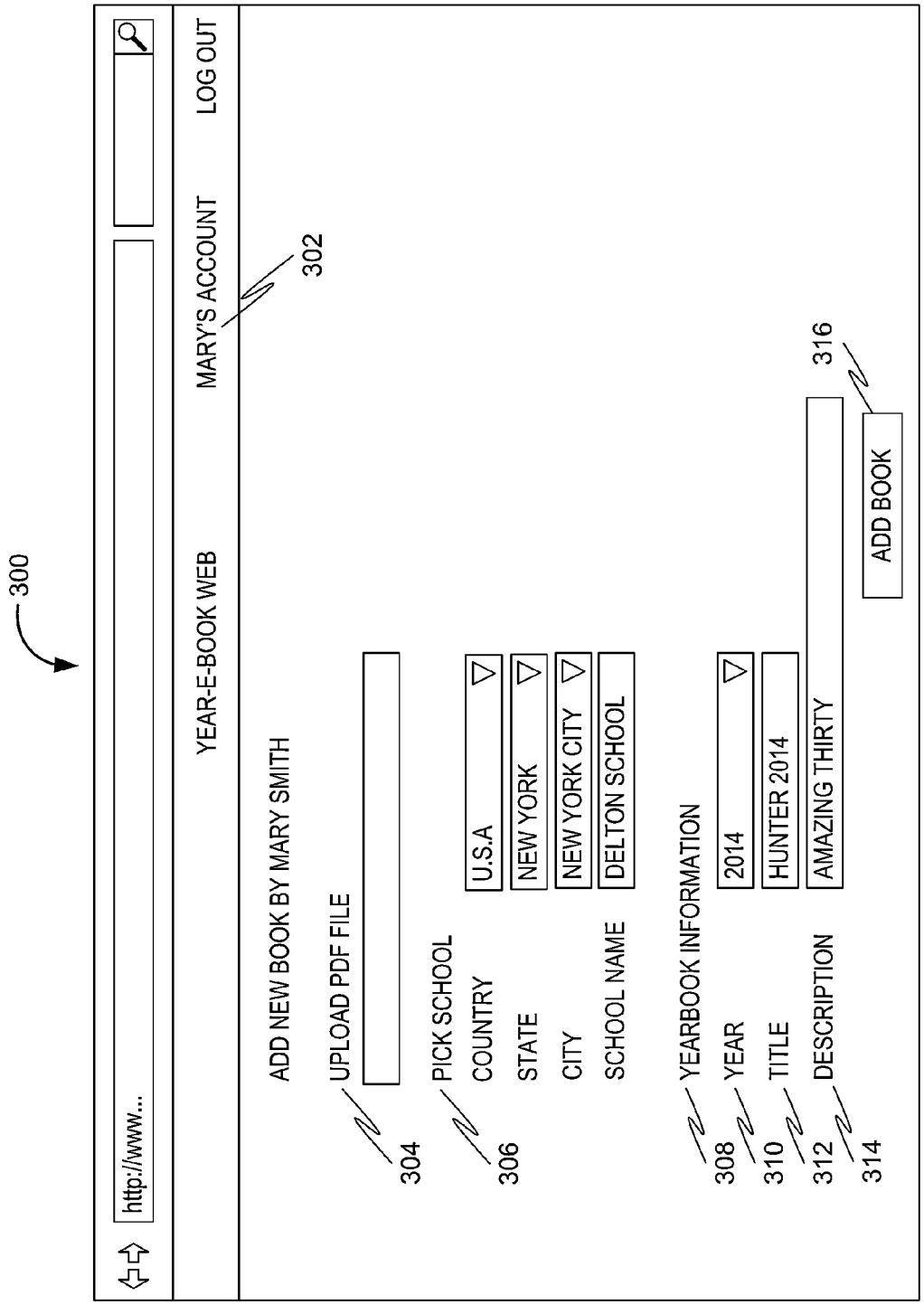
FIG. 3 an illustration of a web interface viewed by a main contact, the web interface includes functionalities that may be used to implement some embodiments of the present disclosure.

Referring now to FIG. 3 a web interface 300 is illustrated, that may be viewed by a main contact (i.e. Mary 302). The web interface 300 includes functionalities that may be used to implement some embodiments of the present disclosure. The web interface 300 may, for example, include a web form that allows Mary 302 to add a new yearbook to the Yearbooker Web Server. The web interface 300 is similar to the web interface 200 explained in detail in conjunction with FIG. 2 above.

Functionality may include, for example, uploading static images of a media volume, such as a Yearbooker. An "upload PDF file" form field 304 allows for uploading one or more static images associated with a Yearbooker or other volume. A "Pick School" form field 306 associates the uploaded static images with a particular school. Other embodiments may include static images of a volume associated with a group of people, such as a family, a company, a department, or other definable group. The web interface 300 may further include "yearbook information" form fields 308 year 310, a title 312 and a description 314. Once the required information is provided, a user such as Mary 302 may use an "Add Book" button 316 to submit the yearbook to the Yearbooker Web Server.

Referring now to FIG. 4A an illustration of a web interface 400 viewed by Mary 302, the web interface 400 includes functionalities that may be used to implement some embodiments of the present disclosure. In some embodiments, web interface 400 may include a web form that allows Mary 302 to update a yearbook. The web interface 400 shows that a title 402 of the yearbook is "Hunter 2014". Further, the web interface 400 may show two or more tabs such as: a "book info" tab 404 and an "invitations" tab 406. When the "book info" tab 404 is selected, the web interface 400 shows the fields "pick school" 408 and "yearbook information" 410. The "pick school" field further includes one or more fields including a country 412, a state 414, a city 416, and a school 418. In the example shown, the country 412 is "U.S.A", the state 414 is "New York", the city 416 is "New York City", and the school 418 is "Delton School". The "yearbook information" field 410 further includes one or more fields including a year 420, a group 422 and a description 424. In the example shown, the year 420 is "2014", the group 422 is "Hunter 2014" and the description 424 is "Amazing thirty". Once the required information is provided, the main contact uses an "update" button 426 to update the yearbook.

Referring now to FIG. 4B an illustration of a web interface 428 viewed by Mary 302, when the "invitations" tab 406 is selected by Mary 302. Mary 302 may send invitations to users (including students and parents) using the web interface 428. Mary 302 enters an invitation message in a "personalized invitation message" field 430. If a personalized invitation message is not provided, then a default message is used. Further, a "grade/class" field 432 is used to indicate the appropriate grade or class. Yet further, the web interface 428 shows a list of rows 434, 436, 438, 440 and 442. Each row 434, 436, 438, 440 and 442 allows Mary 302 to provide details for a user including email, first name and last name of the user. Mary 302 may manually fill in the rows 434, 436, 438, 440 and 442. Further, more rows may be added using an "add more rows" feature 444. Alternatively, Mary 302 may upload a Microsoft EXCEL® document containing the details of the students using an "upload excel" feature 446. The Yearbooker Web Server automatically parses the uploaded Microsoft EXCEL® document to obtain names and email addresses of users. Finally, Mary 302 sends out the invitations using a "send invitations" button 448. Thereafter, the Yearbooker Web Server generates a unique book view ID for each student. The book view ID may be prepared in format such as "book ID_Email_Student's name_Student's class/grade". This book view ID is included in the invitation message sent to most or all users. Further, the invitation message may include a hyperlink to the yearbook, which when activated directs the user to the relevant yearbook on the Yearbooker Web Server. For each invitation, the Yearbooker Web Server may receive an acknowledgement indicating a successful or a failed delivery.

Application User Interface

Figure 5A:
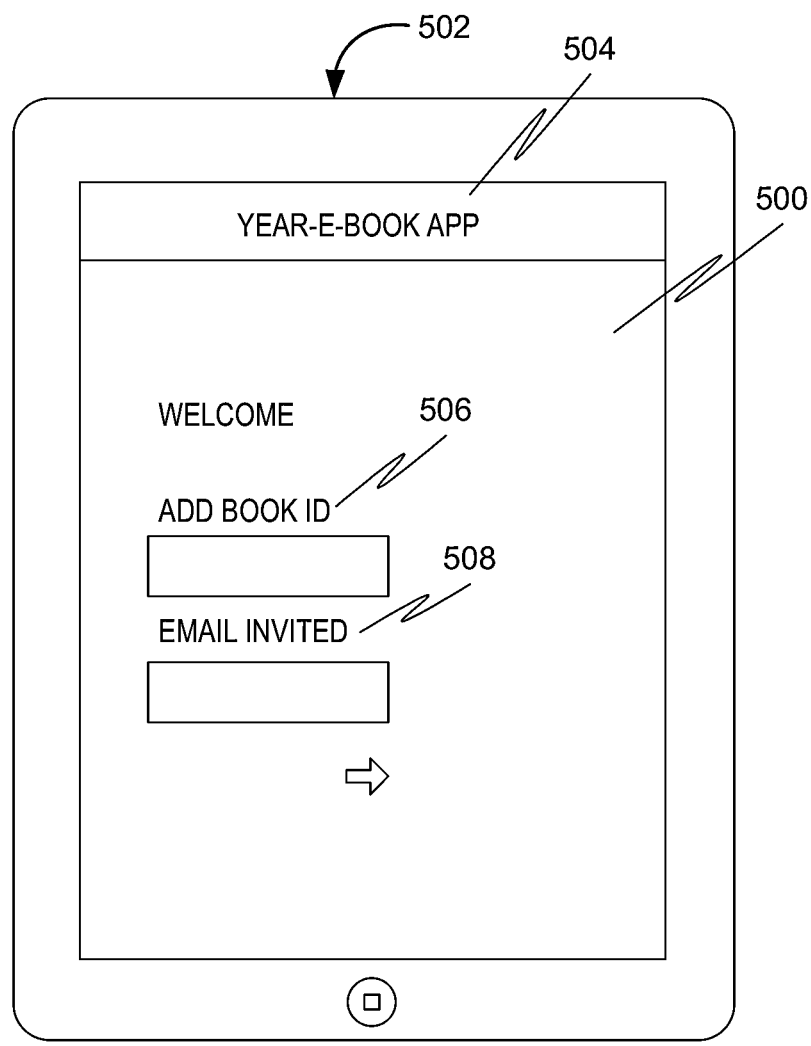
FIGS. 5A-B an illustration of an application user interface viewed by a user, the application user interface includes functionalities that may be used to implement some embodiments of the present disclosure.

Referring now to FIG. 5A an illustration of an application user interface 500 viewed by a user (a student or a parent) on a mobile device 502, the application user interface 500 includes functionalities that may be used to implement some embodiments of In some embodiments,. The application user interface 500 may be displayed when the user receives the invitation message from Mary 302 and follows the hyperlink provided in the invitation message to access the relevant yearbook. The application user interface 500 may be provided by a "Yearbooker" application 504 installed on the mobile device 502. However, if the "Yearbooker" application 504 is not already installed on user's mobile device 502, then the user may be prompted to install the "Yearbooker" application 504. For example, the mobile device may be an Android™; iOS™ or other operating system based device. In some embodiments, a user may access an application providing website such as Apple, Google Play, Amazon or other App store to install a "Yearbooker" application 504.

Figure 5B:
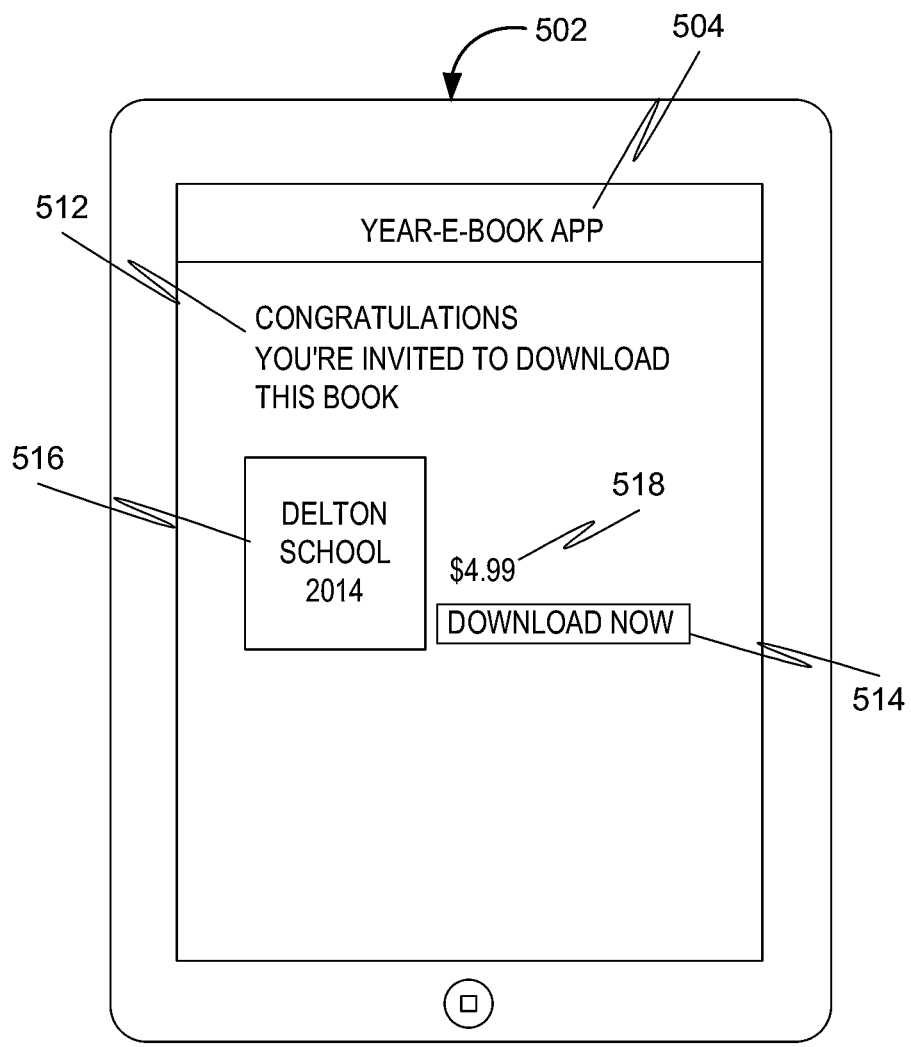

The application user interface 500 is a web form including an "add book ID" field 506 and an "email invited" field 508. The user enters the book view ID obtained from the invitation email into the "add book ID" field 506 and the email ID in the "email invited" field 508. If the book view ID and the email ID are correct, the "Yearbooker" application 504 displays an application user interface 512 on the mobile device 502 as shown in FIG. 5B. The application user interface 512 provides a "download" button 514 that allows the user to download "Delton School 2014" yearbook 516 shared by Mary 302 via the invitation message. The "Delton School 2014" yearbook 516 may be provided at a price. As shown, the application user interface 512 displays a price 518 of the "Delton School 2014" yearbook 516 to be $4.99. Accordingly, the "Yearbooker" application 504 also provides a payment workflow that allows the users to pay the required amount. Further, the revenue generated by selling the yearbooks may be shared among one or more of an Internet company providing the Yearbooker Web Server, a local printer and a school. Accordingly, the Yearbooker Web Server tracks revenue sharing details. In an alternate embodiment, the user accesses the hyperlink in the invitation message and the relevant yearbook is automatically downloaded and added to the "Yearbooker" application 504 installed on the user's mobile device 502. Further, the "Yearbooker" application 504 provides a feature for batch migrating yearbooks to another mobile device.

Figure 6:
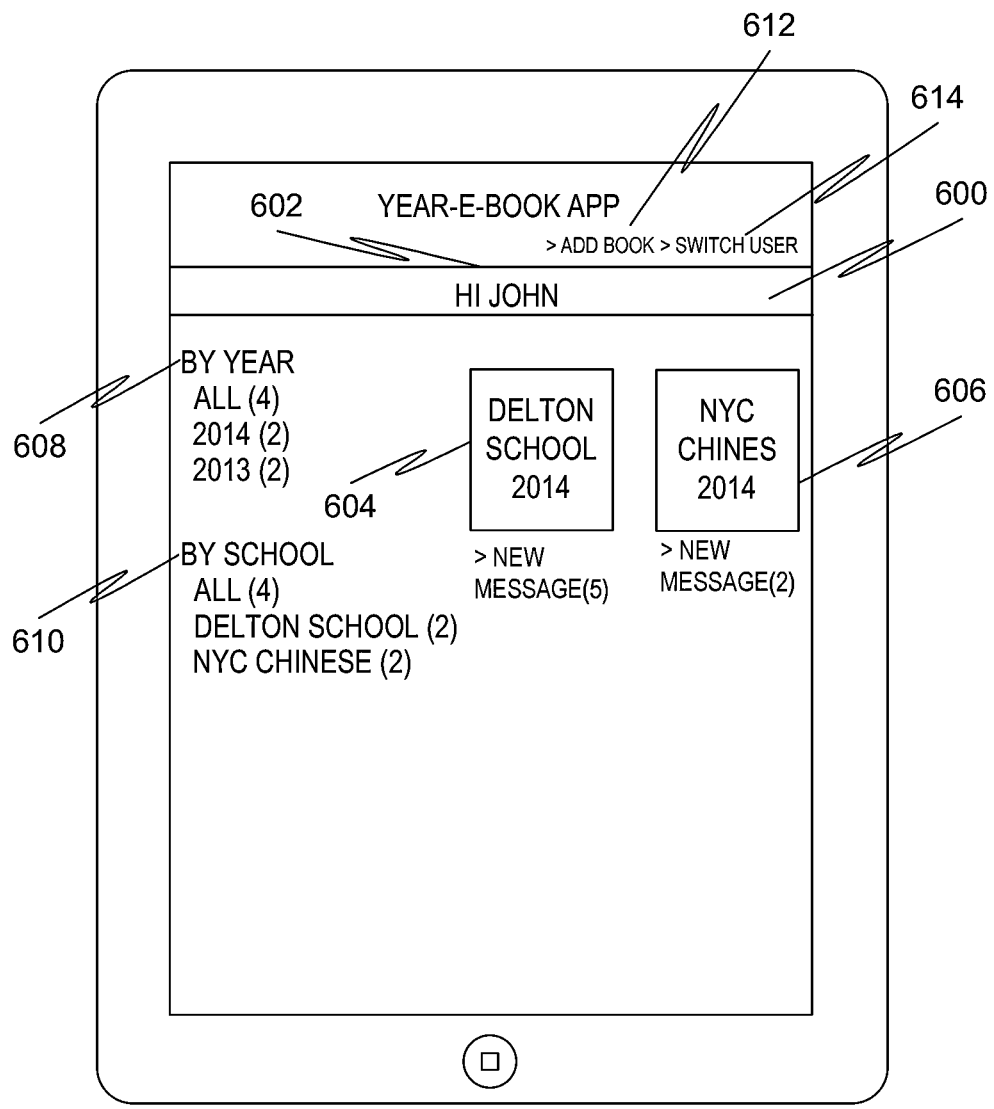
FIG. 6 an illustration of an application user interface viewed by a user, the application user interface includes functionalities that may be used to implement some embodiments of the present disclosure.

Referring now to FIG. 6, an application user interface 600 that may be presented to a user (i.e. John 602) is illustrated. In some embodiments, the application user interface 600 includes functionalities that may be used to implement various aspects of the present disclosure. Some embodiments may include an application user interface 600 that presents yearbooks that John 602 has access to; for example, a "Delta School 2014" yearbook 604 and a "NYC Chinese 2014" yearbook 606. Further, John 602 may access yearbooks by selecting an appropriate year from a list 608 or by selecting an appropriate school from a list 610. Further, John 602 can add more yearbooks using an "add book" button 612. When the "add book" button 612 is activated, John 602 is shown the application user interface 500.

In another aspect, the mobile device may be shared among multiple users. Accordingly, a "Switch User" button 614 may be used to switch the "Yearbooker" application 504 among multiple users. Further, the "Yearbooker" application 504 allows a user to send messages to another user across yearbooks. For example, a user in the "Delton School 2014" yearbook 604 may send a message to another user in the "NYC Chinese 2014" yearbook 606. Further, the "Yearbooker" application 504 allows a user to send personal notes to another user, wherein the personal notes are not publicly accessible. Moreover, a user may invite relevant users from the "Yearbooker" application 504. For example, a student may invite his parents or friends outside school to access the yearbook.

Figure 7A:
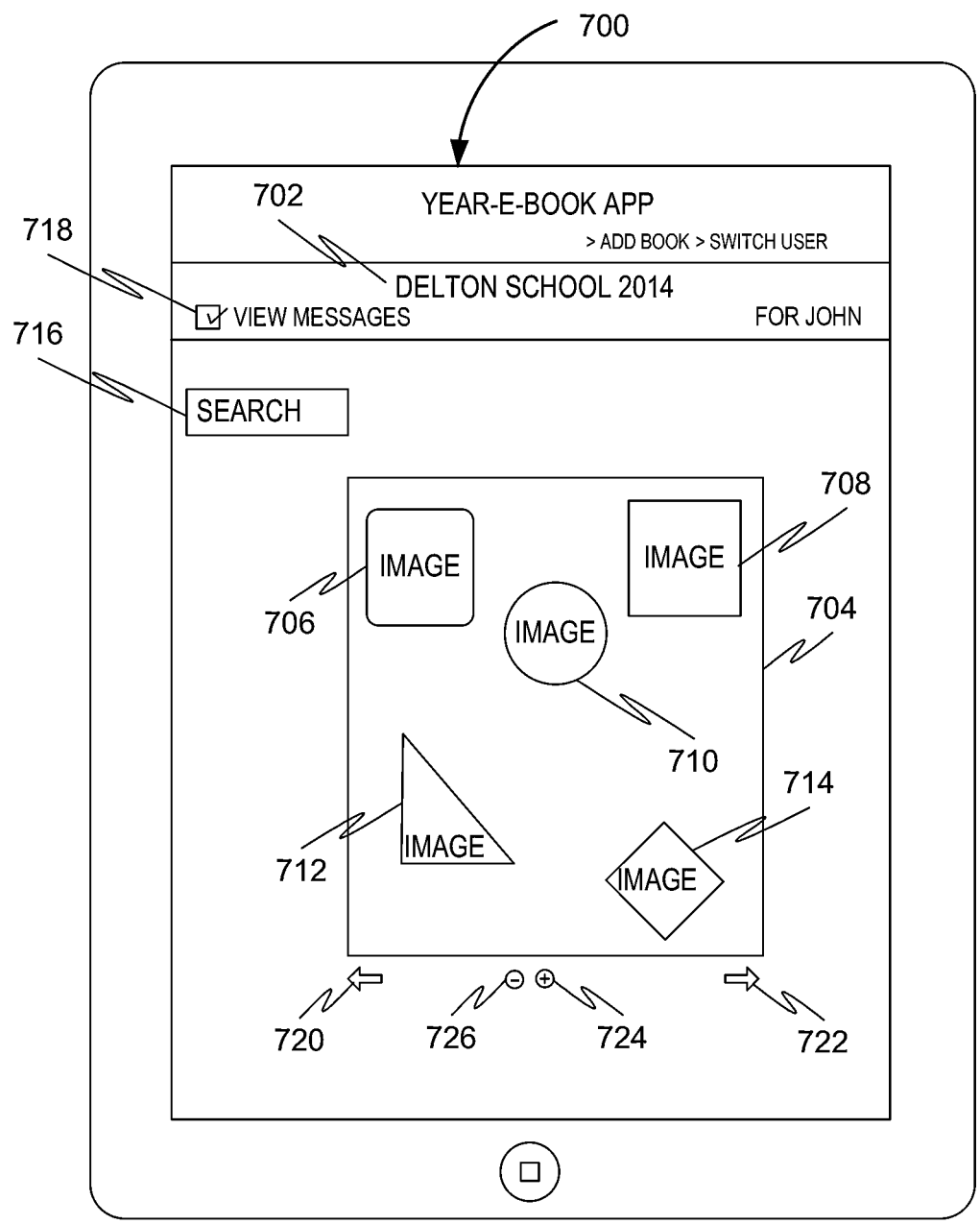
FIGS. 7A-C illustrate an application user interface viewed by a user, the application user interface allows the user to annotate images according to some embodiments of the present disclosure.

Referring now to FIG. 7A an application user interface 700 is illustrated with an exemplary yearbook presented as "Delton school 2014" yearbook 702 to John 602. The application user interface 700 includes a user interactive area 704 showing images 706, 708, 710, 712 and 714. The images 706, 708, 710, 712 and 714 include images of students in the "Delton School 2014" yearbook 702, image provide a Yearbooker Entries shared by students and icons. John 602 may search students and messages using a "Search" button 716. Further, John 602 may view messages or hide messages using a "view images" radio button 718. The "view images" radio button 718 allows John 602 to turn-on or turn-off a Yearbooker Entry layer. John 602 may turn pages to view other students using arrows 720 and 722. In addition, John 602 may zoom-in or zoom-out of the user interactive area 704 using the controls 724 and 726 respectively.

Figure 7B:
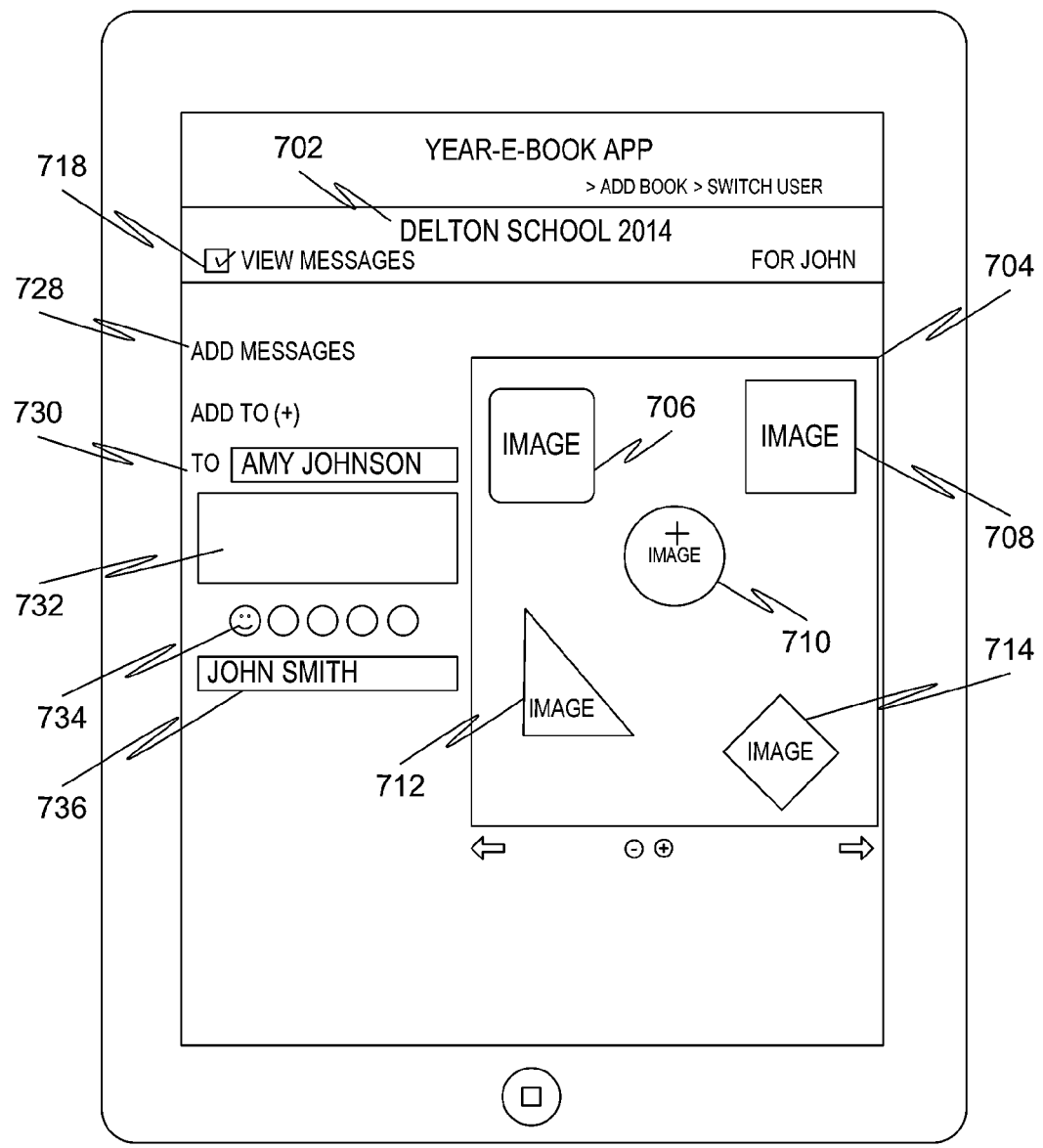
Figure 7C:
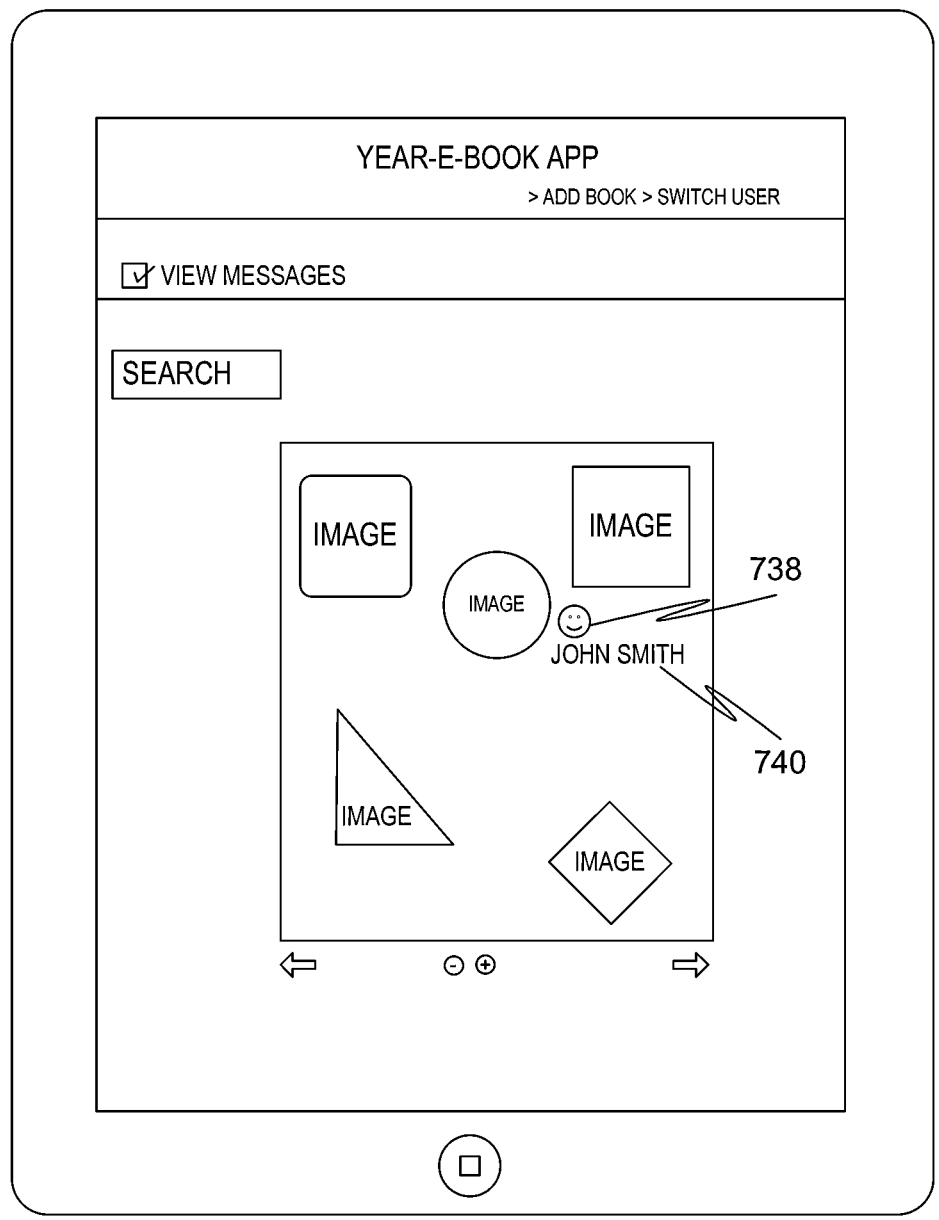

John 602 may input Yearbooker Entries for students shown in user interactive area 704. Accordingly, John 602 may select Spatial Coordinates associated with an image, for example, the image 710 from the application user interface 700. Referring now to FIG. 7B, in response to selection of the image 710, the "Yearbooker" application 504 shows an "add messages" field 728. The "add messages" field 728 further includes a "To" field 730 showing the name of the student ("Amy Johnson") in the selected image 710. In some embodiments, the user may add a Yearbooker Entry in a text area field 732 and add an emoticon 734. The name of the user (i.e. "John Smith") providing a Yearbooker Entry may be displayed in a field 736. John 602 may submit a Yearbooker Entry 738 wherein an emoticon is placed next to the image 710 as shown in FIG. 7C. The name of a Yearbooker Entry author ("John Smith") 740 may also displayed next to a Yearbooker Entry 738.

In some embodiments, a user, such as John 602 may also provide an image of a Yearbooker Entry including an image, a sticker or a signature, a video as a Yearbooker Entry, an audio provide a Yearbooker Entry, a free-style drawing and a data package comprising contact information. Further, the "Yearbooker" application 504 offers in application merchandize such as stickers, emoticons, icons etc. The users may purchase the merchandize and use to provide a Yearbooker Entry in a yearbook. The second student ("Amy Johnson") receives notification about a Yearbooker Entry 738. The "Yearbooker" application 504 allows a second student to accept or reject a Yearbooker Entry 738. Further, the second student may report spam or inappropriate message and block John 602 from posting provide a Yearbooker Entries in future. The "Yearbooker" application 504 also provides latest activity summary to the users.

Further, a Yearbook server may define various types of users including printer representative, school representative, parent, and student. For each user type, the Yearbooker Web Server may define access rights to features of the Yearbooker Web Server. In an exemplary embodiment, the Yearbooker Web Server administrator may auto-generate emails and send them to users, and create accounts for various users.

A printer representative may be granted rights to upload upload static images, such as a PDF images. A parent user may be allowed to set read or write permission settings for their wards. A student user may be allowed to receive invitation email to access a yearbook, self-identify with an image in the yearbook, view the yearbook, add messages to the yearbook, receive message read notices, receive new message notices, receive weekly reminder of new messages or activities and report spam provide a Yearbooker Entry. In some embodiments, a school administrator may be provided with functionality to designate a Yearbooker administrator user.

Mobile Device

Figure 8:
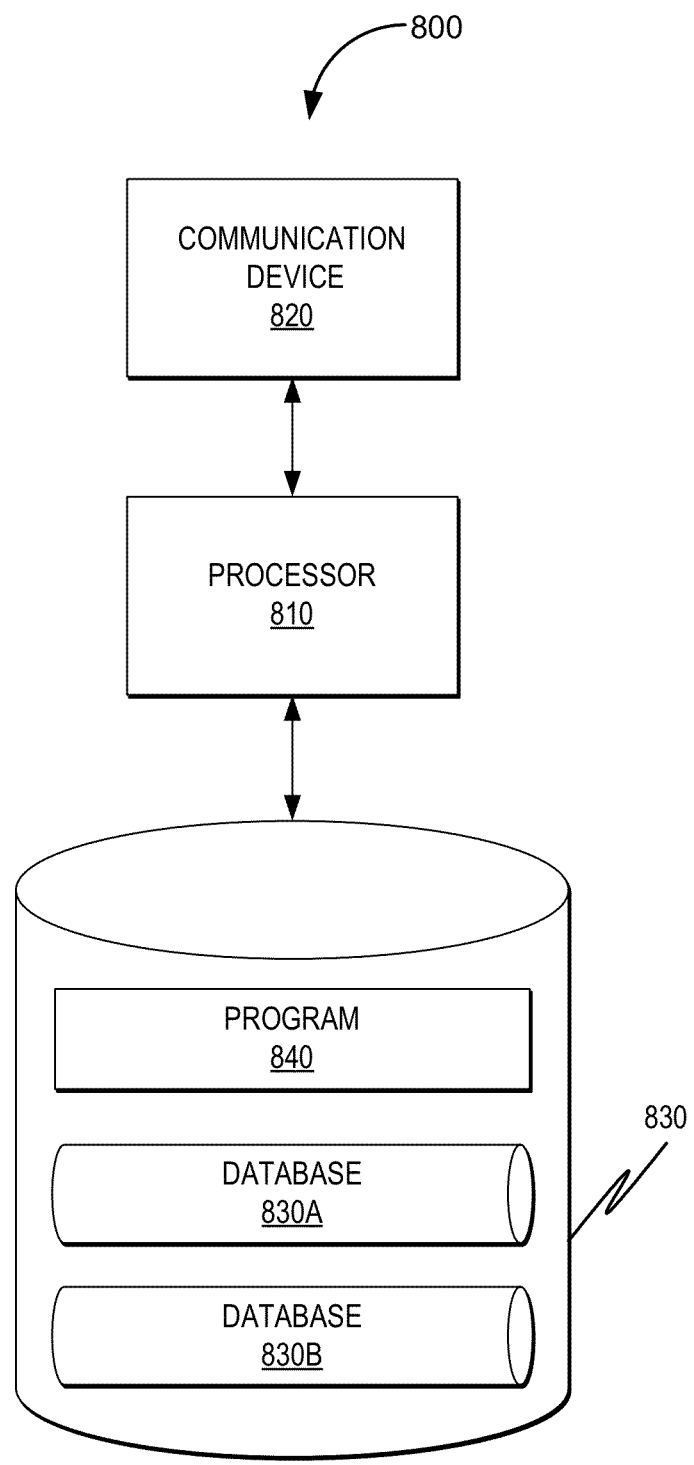
FIG. 8 a block diagram illustrating a controller that may be embodied in one or more of mobiles devices and utilized to implement some embodiments of the present disclosure.

Referring now to FIG. 8, an illustration is provided with a controller 800 that may be embodied in one or more of communications accessible devices and utilized to implement some embodiments of In some embodiments,. Communications accessible devices may include, by way of example, a hand held device such as a cellular phone, a pad device, a personal computer, a server, a personal digital assistant, an electronic reader device or other programmable device.

The controller 800 comprises a processor unit 810, which may include one or more processors, coupled to a communication device 820 configured to communicate via a communication network, such as the Internet, or another cellular based network such as a 3G or 4G network (not shown in FIG. 8). The communication device 820 may be used to communicate with a digital communications network, such as, for example, the Internet available via the Internet Protocol, or a cellular network such as 3G or 4G.

The processor 810 is also in communication with a storage device 830. The storage device 830 may comprise any appropriate information storage device, including combinations of electronic storage devices, such as, for example, one or more of: hard disk drives, optical storage devices, and semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with software instructions included in the program 840. The processor 810 may also cause the communication device 820 to transmit information, including, in some instances, control commands to operate apparatus to implement the processes described above. The storage device 830 can additionally store related data in a database 830A and database 830B, as needed.

Network Diagram

Figure 9:
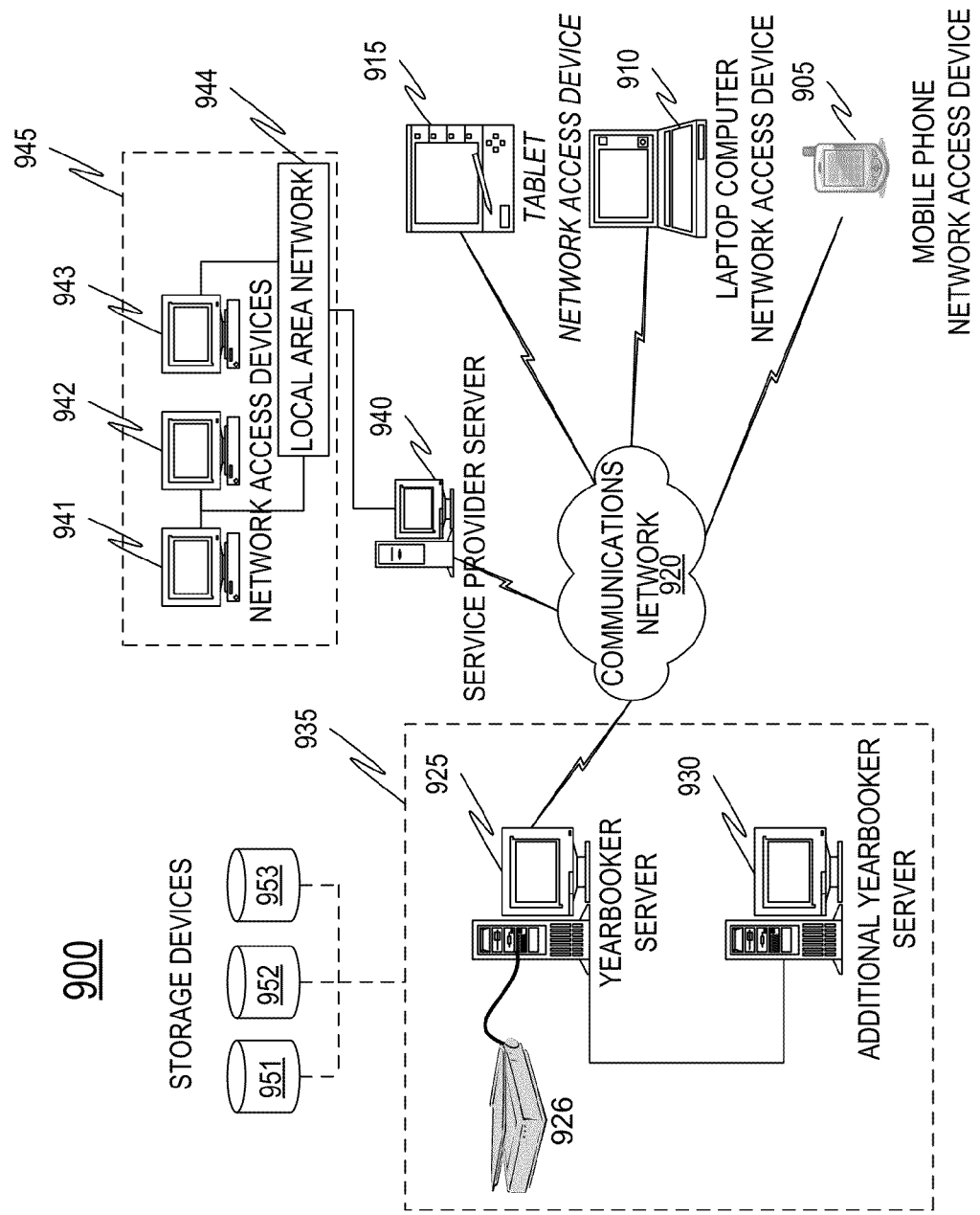
FIG. 9 a network diagram including a processing and interface system for generated an annotated, virtual Yearbooker is illustrated.

Referring now to FIG. 9, a network diagram including a processing and interface system 900 for generating a Yearbooker with static image data and Spatial Coordinates. The system 900 may comprise a Yearbooker server 940; support servers 925, 930; Yearbooker static image and user data storage devices 951, 952, 953; and network access devices 905-915.

An image capture device 926 may provide static image data emulating pages of a yearbook volume to the Yearbooker Server 925. The Yearbooker Server 925 may associate Spatial Coordinates to areas of respective emulated pages of the yearbook volume.

The network access devices 905-915 may allow a user to interface with the system 900. In some embodiments, the system 900 may be linked through a variety of networks. For example, a branch of the system, such as the Yearbooker provider server 940, may have a separate communication system 945, wherein multiple network access devices 941-943 may communicate through a local area network (LAN) 944 connection. The local network access devices 941-943 may include a tablet, a personal computer, a computer, a mobile phone, a laptop, a mainframe, or other digital processing device The Virtual Yearbooker server 940 may connect to a separate communications network 920, such as the Internet. Similarly, network access devices 905-915 may connect to the Virtual Yearbooker server 940 through a communications network 920. The network access devices 905-915 may be operated by multiple parties. For example, a tablet network access device 915 may comprise a cellular tablet. A laptop computer network access device 910 may be a personal device owned by an individual User.

Accordingly, the servers 925, 930, 940 and network access devices 905-915 are separate entities for illustrative purposes only. For example, the Virtual Yearbooker server 940 may be operated by the SDSP, and the Yearbooker servers 925, 930 may be integrated into the Virtual Yearbooker server communication system 945. The Virtual Yearbooker may also provide a digital assistant network access device 915 to Users. Alternatively, the Virtual Yearbooker may only provide the access device 915 to users. In some such aspects, the servers 925, 930, 940 may be operated by a third party or multiple third parties, such as, for example, the manufacturers of the Products carried by the vendor.

Figure 10:
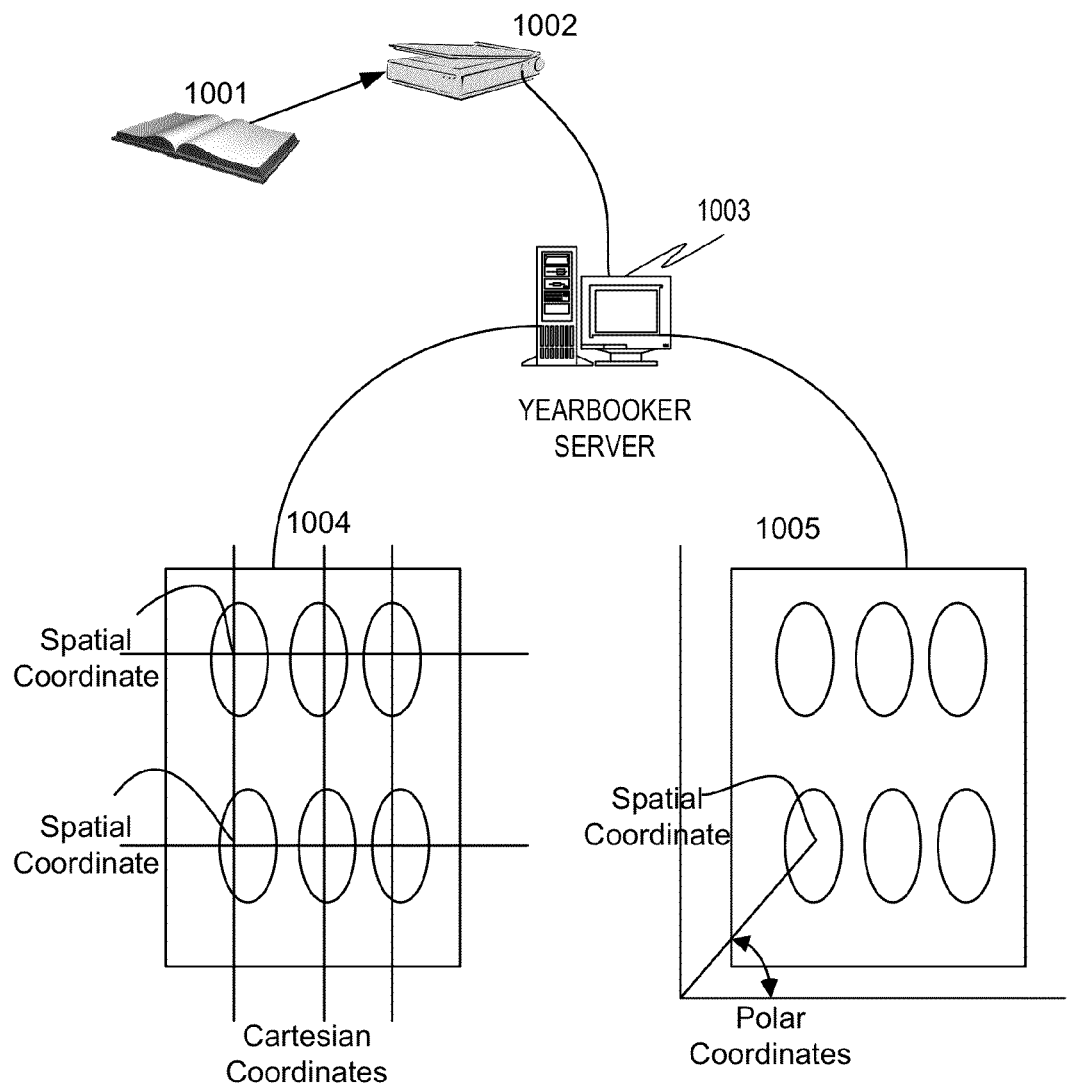
FIG. 10 illustrates a block diagram of an image capture apparatus and associated server.

Referring now to FIG. 10 a block diagram illustrating apparatus for generating a Yearbooker is illustrated. A yearbook volume 1001, or other media book is converted by a digital image generator 1002. The digital image generator 1002 may include, for example an image capture device that creates a static image of respective pages of the physical yearbook. The digital image generator 1002 may operate, by way of non-limiting example based upon charge-coupled device (CCD) input received from the respective pages of the yearbook or other physical volume. In some embodiments, static image data, such as a PDF image may be generated based upon electronic input.

A Yearbooker Server 1003 may receive the static image data of respective pages of a yearbook and correlate areas of the respective pages with Spatial Coordinates 1004-1005. Spatial Coordinates 1004-1005 may include, by way of non-limiting example, one or more of: Cartesian Coordinates, such as an X-Y designation' and a Polar Coordinate, such as a point on a plane determined by a distance from a fixed point and an angle from a fixed direction.

The Yearbooker Server may then receive Yearbooker Entries based upon a page and Spatial coordinate according to the apparatus and methods discussed herein.

Figure 11:
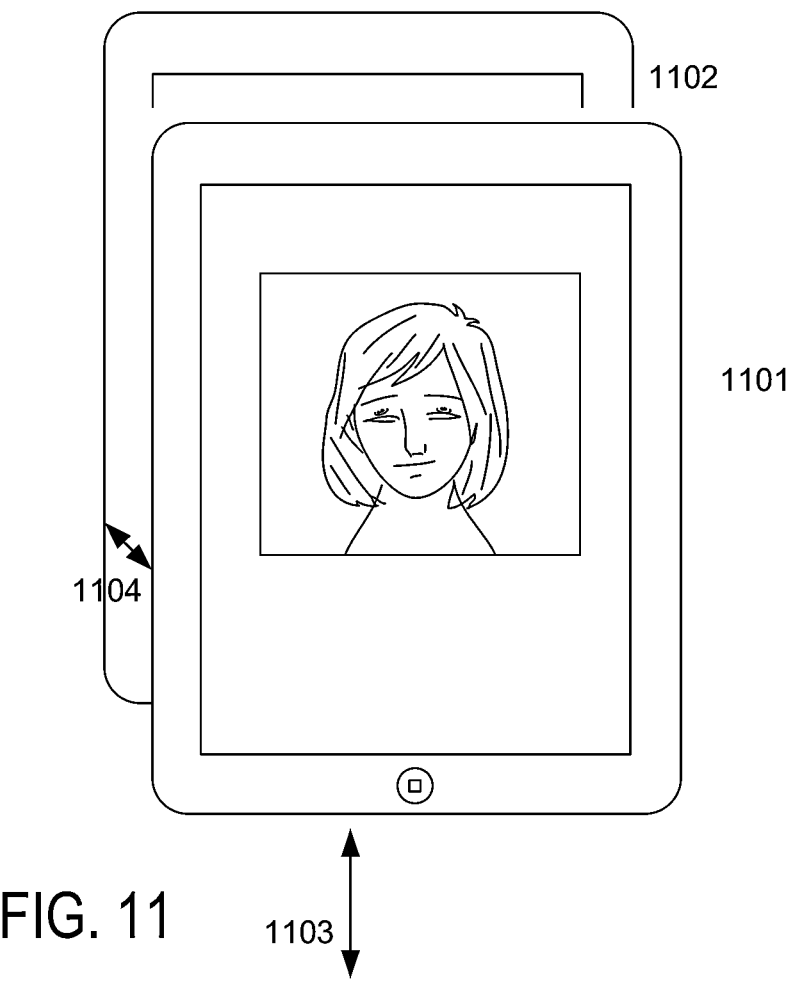
FIG. 11 illustrates apparatus for generating an image for media entry with enhanced depth.

Referring now to FIG. 11, in some embodiments, a Yearbooker Entry may include an image of a user making the entry, wherein the image has enhanced depth. Enhanced depth may be generated by taking multiple image captures 1101 and 1102 with each image capture taken at a different distance 1103 and 1104 respectively. Post image capture processing may process the captured image data and generate a post-processed image with enhanced depth.

Additional variations may include a Yearbooker Entry with a panorama of image data. The panorama of image data may be captured via multiple image capture events (digital pictures) taken in a general arc type pattern around a subject. Typically the subject will include a person making a Yearbooker entry.

Figure 12:
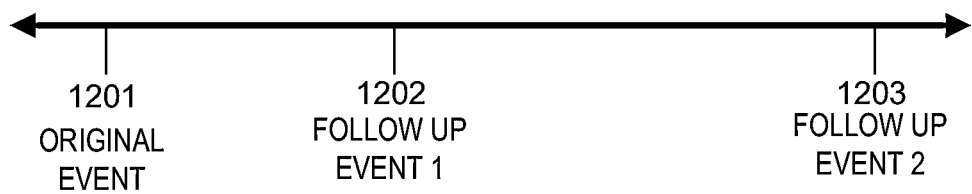
FIG. 12 illustrates a timeline including an original event and one or more follow up events.

Referring now to FIG. 12, in some embodiments, a Yearbooker Entry associated with a Spatial Coordinate and page may be periodically appended to with additional media input. For example, a picture of a student taken during a high school tenure may be accompanied by a picture of the same student at a follow up event. A follow up even may include, by way of example, a high school reunion, or other event. Some embodiments may also include multiple events 1201-1203 with respective updated Yearbooker Entries, which may include the original event 1201 and two follow-up events 1202, 1203.

CONCLUSION

A number of embodiments have been described. While this specification contains many specific implementation details, there should not be construed as limitations on the scope of any disclosures or of what may be claimed, but rather as descriptions of features specific to particular embodiments of In some embodiments,.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

The invention claimed is:

1. An image generating apparatus for providing an infrastructure for generating an interactive Yearbooker volume based upon a static replication of a hardcopy yearbook, the apparatus comprising:
    an image capture device for generating digital image data representative of disparate pages of the hardcopy yearbook, wherein each disparate page memorializes a designated page of the hardcopy yearbook as static image data;
    one or more computer servers for post processing the digital image data representative of one or more pages of the hardcopy yearbook, said computer server in logical communication with the image capture device and accessible with a network access device via a digital communications network; and
    executable software stored on the one or more computer servers and executable on demand, the software operative with the one or more servers to cause the apparatus to:
        receive the static image data memorializing designated pages of the hardcopy yearbook from the image capture device;
        assign the static image data with respective page numbers;

associate Cartesian Coordinates with specific segregated spatial areas of the static image data received from the image capture device;

designate an area to post media entries for respective Cartesian Coordinates;

transmit over the digital communications network to a First user, a first Yearbooker interface comprising the static image data, the assigned page number and the Cartesian Coordinates associated with specified areas of the static image data;

receive via the digital communications network an identification of the First User;

receive via the digital communications network a designation of a First User selected page number and a First User selected Cartesian Coordinate from the First Yearbooker Interface;

receive from the First User via the digital communications network a Yearbooker entry associated with the First User and the selected page number and selected Cartesian Coordinate, wherein said Yearbooker entry comprises a media entry and a designation of a recipient Second User;

generate a second Yearbooker interface comprising the static image data and the Yearbooker entry located in the area designated as the area to post media entries for the selected Cartesian Coordinates;

transmit to a Second User a Second User Interface, said Second User Interface comprising a notification that the Yearbook entry has been received from the First User and an interactive control functional to transmit an indication of the Second User accepting or rejecting the Yearbooker entry, wherein the Second User comprises a recipient of the Yearbook entry;

receive from the recipient of the Yearbooker entry via the digital communications network an indication accepting the Yearbooker entry; and transmit the Yearbooker volume comprising the static image of a selected page and the Yearbooker entry specifically entered for the Second User by the First User based upon receipt of the indication accepting the Yearbooker entry.

2. The apparatus of claim 1 wherein the executable software stored on the one or more computer servers and executable on demand, is additionally operative with the one or more computer servers to cause the apparatus to transmit a confirmation to the First User that the Yearbooker entry has been received by the Second User.

3. The apparatus of claim 2 wherein the executable software stored on the one or more computer servers and executable on demand, is additionally operative with the one or more computer servers to cause the apparatus to receive a response from the Recipient User to accept the Yearbooker entry into a storage as part of the Recipient User's Yearbooker.

4. The apparatus of claim 2 wherein the executable software stored on the one or more computer servers and executable on demand, is additionally operative with the one or more computer servers to cause the apparatus to receive a subsequent Yearbooker entry from the First User, wherein the subsequent Yearbooker entry is correlated with the Cartesian Coordinates.

5. The apparatus of claim 4 wherein the static image data comprises images of students associated with a same learning institution.

6. The apparatus of claim 4 wherein the static image data comprises images of employees of a same legal entity.

7. The apparatus of claim 4 wherein the static image data comprises images of team members of a same sports team.

8. The apparatus of claim 4 wherein the static image data comprises images capturing a life event.

9. The apparatus of claim 4 wherein the Yearbooker Entry comprises a text message.

10. The apparatus of claim 4 wherein the Yearbooker Entry comprises a picture.

11. The apparatus of claim 4 wherein the Yearbooker Entry comprises an emoticon.

12. The apparatus of claim 4 wherein the Yearbooker Entry comprises a free-style drawing.

13. The apparatus of claim 4 wherein the Yearbooker Entry comprises a video clip.

14. The apparatus of claim 4 wherein the Yearbooker Entry comprises an audio clip.

15. The apparatus of claim 4 wherein the software is additionally operative to transmit an administrator interface to configure the Yearbooker interface.

16. The apparatus of claim 2 wherein the software is additionally operative to cause the one or more servers to:

receive an image of the First User;

include the image of the First User with the Yearbooker entry specifically entered for the Second User by the First User;

assign a designated area to post the media entry based upon the Cartesian of an image of the First User;

assign a unique identifier to the Yearbooker entry specifically entered for the Second User by the First User; and track the Yearbooker entry specifically entered for the Second User by the First User according to the Unique Identifier.

\* \* \* \* \*